United States Patent
Gurram et al.

(10) Patent No.: US 7,409,344 B2
(45) Date of Patent: Aug. 5, 2008

(54) XML BASED ARCHITECTURE FOR CONTROLLING USER INTERFACES WITH CONTEXTUAL VOICE COMMANDS

(75) Inventors: Rama Gurram, San Jose, CA (US); Frances James, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 607 days.

(21) Appl. No.: 11/074,082

(22) Filed: Mar. 8, 2005

(65) Prior Publication Data

US 2006/0206336 A1      Sep. 14, 2006

(51) Int. Cl.
*G10L 15/00*      (2006.01)
(52) U.S. Cl. .................. 704/251; 704/275; 704/270; 379/88.01; 379/88.03
(58) Field of Classification Search .............. 704/251, 704/270, 275, 254; 379/88.01, 88.03
See application file for complete search history.

(56) References Cited

U.S. PATENT DOCUMENTS

| | | | |
|---|---|---|---|
| 4,509,133 A | 4/1985 | Monbaron et al. |
| 4,783,803 A | 11/1988 | Baker et al. |
| 4,829,576 A | 5/1989 | Porter |
| 5,289,375 A | 2/1994 | Fukumochi et al. |
| 5,619,708 A | 4/1997 | Ho |
| 5,799,279 A | 8/1998 | Gould et al. |
| 5,805,775 A | 9/1998 | Eberman et al. |
| 5,812,977 A | 9/1998 | Douglas |
| 5,828,991 A | 10/1998 | Skiena et al. |
| 5,884,262 A | 3/1999 | Wise et al. |
| 5,893,063 A | 4/1999 | Loats et al. |
| 5,991,719 A | 11/1999 | Yazaki et al. |
| 6,012,030 A | 1/2000 | French-St. George et al. |

(Continued)

FOREIGN PATENT DOCUMENTS

EP      0 878948      11/1998

(Continued)

OTHER PUBLICATIONS

Lernout and Houspie, "Dragon Naturally Speaking 5," Dragon Naturally Speaking User's Guide, Oct. 2000, pp. 1-131.

(Continued)

*Primary Examiner*—Daniel D Abebe
(74) *Attorney, Agent, or Firm*—Fish & Richardson P.C.

(57) ABSTRACT

A voice-enabled user interface includes a first user interface. A voice extension module is associated with the first user interface and is configured to voice-enable the first user interface. The voice extension module includes a speech recognition engine, an XML configuration repository, a preprocessor, and an input handler. The XML configuration repository includes one or more XML files specifying one or more voice commands for signaling for execution of one or more semantic operations that may be performed using the first user interface. The preprocessor is configured to register with the speech recognition engine the one or more voice commands. The input handler is configured to receive a first voice command and to communicate with the preprocessor to execute a semantic operation from the one or more semantic operations that may be performed using the first user interface. The first voice command is one of the one or more voice commands registered with the speech recognition engine by the preprocessor, and the first voice command signals for execution of the semantic operation.

17 Claims, 12 Drawing Sheets

U.S. PATENT DOCUMENTS

| | | | |
|---|---|---|---|
| 6,108,629 | A | 8/2000 | Kasday |
| 6,125,376 | A | 9/2000 | Klarlund et al. |
| 6,175,820 | B1 | 1/2001 | Dietz |
| 6,192,343 | B1 | 2/2001 | Morgan et al. |
| 6,434,524 | B1 | 8/2002 | Weber |
| 2001/0043234 | A1 | 11/2001 | Kotamarti |
| 2003/0079051 | A1 | 4/2003 | Moses et al. |
| 2003/0083882 | A1* | 5/2003 | Schemers, III et al. ... 704/270.1 |
| 2003/0125956 | A1 | 7/2003 | Lewis et al. |
| 2003/0208352 | A1 | 11/2003 | Lee |
| 2003/0233238 | A1* | 12/2003 | Creamer et al. .......... 704/270.1 |
| 2004/0078201 | A1* | 4/2004 | Porter et al. ................ 704/275 |
| 2004/0128136 | A1 | 7/2004 | Irani |
| 2004/0138891 | A1 | 7/2004 | Vora |
| 2005/0053201 | A1* | 3/2005 | Bhargava et al. ......... 379/88.01 |
| 2005/0129198 | A1* | 6/2005 | Sudhir et al. ............ 379/90.01 |
| 2006/0064302 | A1* | 3/2006 | Ativanichayaphong et al. .......................... 704/235 |
| 2006/0074652 | A1* | 4/2006 | Ativanichayaphong et al. .......................... 704/235 |
| 2006/0106608 | A1* | 5/2006 | Weinmeister ............... 704/257 |

FOREIGN PATENT DOCUMENTS

| | | |
|---|---|---|
| JP | 2002-023996 | 1/2002 |

OTHER PUBLICATIONS

Foley et al., "Computer Graphics, Principles and Practice," Addison-Wesley, Reading, US, 1996, pp. 1-49.

James and Roelands, "Voice over Workplace (VoWP): Voice Navigation in a Complex Business GUI," Proceedings of the fifth international ACM conference on Assistive technologies, Edinburgh, Scotland, 2002, ACM Press, NY, NY, pp. 197-204.

'Using small screen space more efficiently' [online]. Kamba et al., 1996, [retrieved on Jan. 16, 2007]. Retrieved from the Internet: <URL: http://delivery.acm.org/10.1145/240000/238582/p383-kamba.pdf?key1=238582&key2=1123698611&coll=portal&dl=ACM&CFID=11586080&CFTOKEN=77013129>, 8 pages.

Accessibility™, "Windows 98® Accessibility Features and Functions," Microsoft® TechNet, Knowledge Base Appendix H, © 1998.

Conversā™, "Surf the WEB with Your Voice," Product Packaging © 1998.

Core Java Internationalization [online]. Sun Microsystems, Inc., undated materials, [retrieved on Dec. 22, 2004]. Retrieved from the Internet: <URL: http://java.sun.com/j2se/corejava/intl/index.jsp>.

Dragon Naturally Speaking (DNS) Voice Recognition Version 8.0, [online]. [Retrieved on Feb. 16, 2005]. Retrieved from the Internet: <URL: http://www.dragontalk.com/NATURAL.htm>.

Edwards, W. Keith, et al., "An Architecture for Transforming Graphical Interfaces," Proceedings of the 7th Annual ACM Symposium on User Interface Software and Technology, Nov. 1994, pp. 39-47.

Higgins, Dennis, et al., "Speech-Enabled SQL Database Applications Using Java," The Journal of Computing in Small Colleges, vol. 16 (3), Mar. 2001, pp. 26-38.

Huang, Chung-Ming, et al., "Surfing the Web Using a Telephone Set," Proceedings of the 26th EUROMICRO Conference (EUROMICRO'00), The Netherlands, Sep. 5-7, 2000, vol. 2, pp. 126-133.

James, Frankie, et al., "Voice Over Workplace (VoWP): Voice Navigation in a Complex Business GUI," Proceedings of the $5^{th}$ International ACM Conference on Assistive Technologies (Assets 2002), Jul. 8-10, 2002, pp. 197-204.

JustVoice™: Voice Recognition for MS Windows 95, User's Guide and Installation Guide, Interactive Products Inc.

Narayanaswami, Anand, et al., "An Online Prototype Speech-Enabled Information Access Tool Using Java Speech Application Programming Interface," Proceedings of the $33^{rd}$ Southeastern Symposium on System Theory, Mar. 2001, pp. 111-115.

Noon, Bill, 'ListenUp! Speech Recognition PlugIn for Netscape 2.0' [online], [retrieved on Feb. 18, 2005]. Retrieved from the Internet: <URL: http://snow.cit.cornell.edu/noon/ListenUp.html>.

"Plato™ HouseLinc SmartLinc," online screen excerpts, Tom Gillespie, © 1997.

Speech Synthesis Markup Language (SSML) Version 1.0, Ch. 1 (pp. 1-11, 42), [online]. W3C, Sep. 7, 2004, [retrieved on Feb. 16, 2005]. Retrieved from the Internet: <URL: http://www.w3.org/TR/speech-synthesis/>.

ViaVoice Product Overview, [online]. IBM, [retrieved on Feb. 16, 2005]. Retrieved from the Internet: <URL: http://www.306.ibm.com/software/voice/viavoice/>.

Voice Extensible Markup Language (VoiceXML) Version 2.0, Ch. 1 (pp. 1-28), [online]. W3C, Mar. 16, 2004, [retrieved on Dec. 22, 2004]. Retrieved from the Internet: <URL: http://www.w3.org/TR/voicexml20/>.

VoiceAssist™ User's Guide, Creative Labs Inc., © 1993.

White, Jim, "Voice Browsing," IEEE Internet Computing, Jan./Feb. 2000, pp. 55-56.

JustVoice™: Voice Recognition for MS Windows 95, User's Guide and Installation Guide, Interactive Products Inc.: © Jan. 1995.

* cited by examiner

```xml
<?xml version="1.0" encoding=UTF-8"?>
<VER xmins:xdb="http://xmins.oracle.com/xdb" xmins:xsi="http://www.w3.org/2001/XMLSchema-
instance" xsi:noNamespaceSchemaLocation="C:\ VER.xsd">
        <VER_APP id="ESS" name="Employee Self Service">
                <VER_ROLE id="EmpID1"name="Employee">
                        <COMMAND id="ess_cid1" name="ess command one">
                                <CommandText>available vacation</CommandText>
                                <CommandType>application command</CommandType>
                                <CommandPath>http://{hostname}/ess/vacation</CommandPath>
                                <RequestType>HTTPGET</RequestType>
                                <RequestParameters></RequestParameters>
                        </COMMAND>
                        <COMMAND id="ess_cid2" name="ess command two">
                                <CommandText>time sheet</CommandText>
                                <CommandType>application command</CommandType>
                                <CommandPath>http://{hostname}/ess/timesheet</CommandPath>
                                <RequestType>HTTPGET</RequestType>
                                <RequestParameters></RequestParameters>
                        </COMMAND>
                </VER_ROLE>
                <VER_ROLE id="EmpID2" name="Manager">
                        <COMMAND id="ess_cid3" name="ess command 3">
                                <CommandText>employee year end review</CommandText>
                                <CommandType>application command</CommandType>
                                <CommandPath>http://{hostname}/ess/employee_review/?period=yearly
                                        </CommandPath>
                                <RequestType>HTTPGET</RequestType>
                                <RequestParameters></RequestParameters>
                        </COMMAND>
                </VER_ROLE>
        </VER_APP>
        <VER_APP id="BW" name="Business WareHouse">
                <VER_ROLE id="EmpIID3" name="Manager">
                        <COMMAND id="bw_cid1" name="bw command one">
                                <CommandText>financial reports for first quarter</CommandText>
                                <CommandType>application command</CommandType>
                                <CommandPath>http://{hostname}/bw/financial reports?qtr=1
                                        </CommandPath>
                                <RequestType>HTTPGET</RequestType>
                                <RequestParameters></RequestParameters>
                        </COMMAND>
                </VER_ROLE>
        </VER_APP>
</VER>
```

FIG. 4

XML BASED ARCHITECTURE FOR CONTROLLING USER INTERFACES WITH CONTEXTUAL VOICE COMMANDS

CROSS REFERENCE TO RELATED APPLICATIONS

This application is a related to U.S. application Ser. No. 11/020,756, filed Dec. 22, 2004, and titled "Controlling User Interfaces with Contextual Voice Commands."

TECHNICAL FIELD

This document relates to voice controlled user interfaces.

BACKGROUND

Much of software used in business today takes the form of complex graphical user interfaces (GUIs). Complex GUIs allow users to perform many tasks simultaneously while maintaining the context of the rest of their work; however, such systems are often mouse- and keyboard-intensive, which can be problematic or even impossible to use for many people, including those with physical disabilities. Voice interfaces can provide an accessible solution for physically disabled users if steps are taken to address inherent usability problems, such as user efficiency and ambiguity handling. Additionally, voice interfaces may increase the efficiency of performing certain tasks.

Large resources have been expended to develop web-based applications to provide portable, platform-independent front ends to complex business applications using, for example, the hypertext markup language (HTML) and/or JavaScript. Because software applications have typically been developed with only the visual presentation in mind, little attention has been given to details that would facilitate the development of voice interfaces.

In most computer or data processing systems, user interaction is provided using only a video display, a keyboard, and a mouse. Additional input and output peripherals are sometimes used, such as printers, plotters, light pens, touch screens, and bar code scanners; however, the vast majority of computer interaction occurs with only the video display, keyboard, and mouse. Thus, primary human-computer interaction is provided through visual display and mechanical actuation. In contrast, a significant proportion of human interaction is verbal. Various technologies have been developed to provide some form of verbal human-computer interactions, ranging from simple text-to-speech voice synthesis applications to more complex dictation and command-and-control applications. It is desirable to further facilitate verbal human-computer interaction to increase access for disabled users and to increase the efficiency of user interfaces.

SUMMARY

In one general aspect, a voice-enabled user interface includes a first user interface. A voice extension module is associated with the first user interface and is configured to voice-enable the first user interface. The voice extension module includes a speech recognition engine, an XML configuration repository, a preprocessor, and an input handler. The XML configuration repository includes one or more XML files specifying one or more voice commands for signaling for execution of one or more semantic operations that may be performed using the first user interface. The preprocessor is configured to register with the speech recognition engine the one or more voice commands. The input handler is configured to receive a first voice command and to communicate with the preprocessor to execute a semantic operation from the one or more semantic operations that may be performed using the first user interface. The first voice command is one of the one or more voice commands registered with the speech recognition engine by the preprocessor, and the first voice command signals for execution of the semantic operation.

Implementations may include one or more of the following features. For example, the XML configuration repository may categorize the one or more voice commands into one or more roles of users of the first user interface. The preprocessor may be configured to register with the speech recognition engine one or more voice commands from within the XML configuration repository that are representative of a particular one of the one or more roles. The particular role may correspond to a user of the first user interface.

The voice extension module may include an error handler that is configured to handle errors in the execution of the semantic operation that is executed in response to the first voice command. The error handler may be configured to prompt for additional information that further specifies the semantic operation that is executed in response to the first voice command.

The one or more XML files included in the XML configuration repository may specify one or more additional voice commands for switching to a second user interface. The preprocessor may be configured to register with the speech recognition engine the one or more additional voice commands. The input handler may be configured to receive a second voice command and to communicate with the preprocessor to switch to the second user interface. The second voice command may be one of the one or more additional voice commands registered with the speech recognition engine by the preprocessor.

The voice-enabled user interface may include a second user interface. The one or more XML files included in the XML configuration repository may specify one or more additional voice commands for signaling for execution of one or more semantic operations that may be performed using the second user interface. The preprocessor may be configured to register with the speech recognition engine the one or more additional voice commands. The input handler may be configured to receive a second voice command and to communicate with the preprocessor to execute a semantic operation from the one or more semantic operations that may be performed using the second user interface. The second voice command may be one of the one or more additional voice commands registered with the speech recognition engine by the preprocessor, and the second voice command may signal for execution of the semantic operation.

The preprocessor may include a parser and a generator. The parser may be configured to identify the one or more voice commands from the one or more XML files included in the XML configuration repository. The translator may be configured to register the one or more voice commands with the speech recognition engine such that the one or more semantic operations may be executed in response to the one or more voice commands.

The voice extension module may include a web service interface that is configured to receive the one or more XML files included in the XML configuration repository. The web service interface also may be configured to store the received XML files in the XML configuration repository.

The first user interface may be at least one from a group including a hypertext markup language (HTML) document presented in a web browser, a Java Script document presented in a web browser, a standalone application, and a user interface for a web services application.

In another general aspect, a voice extension module for voice-enabling a user interface includes a speech recognition engine. An XML configuration repository includes one or more XML files specifying one or more voice commands for signaling for execution of one or more semantic operations that may be performed using a user interface. A preprocessor is configured to register with the speech recognition engine the one or more voice commands. An input handler is configured to receive a first voice command and to communicate with the preprocessor to execute a semantic operation from the one or more semantic operations that may be performed using the first user interface. The first voice command is one of the voice commands registered with the speech recognition engine by the preprocessor, and the first voice command signals for execution of the semantic operation.

Implementations may include one or more of the following features. For example, the XML configuration repository may categorize the one or more voice commands into one or more roles of users of the first user interface. The preprocessor may be configured to register with the speech recognition engine one or more voice commands from within the XML configuration repository that are representative of a particular one of the one or more roles. The particular role may correspond to a user of the first user interface.

An error handler may be configured to handle errors in the execution of the semantic operation that is executed in response to the first voice command. The error handler also may be configured to prompt for additional information that further specifies the semantic operation that is executed in response to the first voice command.

The one or more XML files included in the XML configuration repository may specify one or more additional voice commands for switching to a second user interface. The preprocessor may be configured to register with the speech recognition engine the one or more additional voice commands. The input handler may be configured to receive a second voice command and to communicate with the preprocessor to switch to the second user interface. The second voice command may be one of the one or more additional voice commands registered with the speech recognition engine by the preprocessor.

The one or more XML files included in the XML configuration repository may specify one or more additional voice commands for signaling for execution of one or more semantic operations that may be performed using a second user interface. The preprocessor may be configured to register with the speech recognition engine the one or more additional voice commands. The input handler may be configured to receive a second voice command and to communicate with the preprocessor to execute a semantic operation from the one or more semantic operations that may be performed using the second user interface. The second voice command may be one of the one or more additional voice commands registered with the speech recognition engine by the preprocessor, and the second voice command may signal for execution of the semantic operation.

The preprocessor may include a parser and a translator. The parser may be configured to identify the one or more voice commands from the one or more XML files included in the XML configuration repository. The translator may be configured to register the one or more voice commands with the speech recognition engine such that the one or more semantic operations may be executed in response to the one or more voice commands.

A web service interface may be configured to receive the one or more XML files included in the XML configuration repository. The web service interface also may be configured to store the received XML files in the XML configuration repository.

In another general aspect, enabling a user interface to be controlled with voice commands includes accessing an XML configuration repository that specifies one or more voice commands for execution of one or more semantic operations that may be performed using a first user interface for a first application. Each voice command corresponds to at least one of the semantic operations. At least one of the voice commands is identified from the XML configuration repository. The identified voice command is registered with a speech recognition engine and an input handler to enable voice control of the first user interface. A particular one of the one or more semantic operations is performed in response to a first voice command. The first voice command is the voice command registered with the speech recognition engine and the input handler, and the first voice command corresponds to the particular semantic operation.

Implementations may include one or more of the following features. For example, a role of a user of the first user interface may be identified. The one or more voice commands may be organized within the XML configuration repository into one or more roles of users of the first user interface. Identifying at least one of the voice commands may include identifying one or more voice commands that correspond to the identified role from the XML configuration repository.

At least one additional voice command may be identified from the XML configuration repository. The at least one additional voice command may correspond to one or more switches to a second user interface for a second application. The at least one additional voice command may be registered with the speech recognition engine and the input handler to enable switching to the second user interface. A particular one of the switches to the second user interface may be performed in response to a second voice command. The second voice command may be the additional voice command registered with the speech recognition engine and the input handler, and the second voice command may correspond to the particular switch to the second user interface.

At least one additional voice command may be identified from the XML configuration repository. The at least one additional voice command may correspond to one or more semantic operations that may be performed using a second user interface for a second application. The at least one additional voice command may be registered with the speech recognition engine and the input handler to enable voice control of the second user interface. A particular one of the semantic operations that may be performed using the second user interface may be performed in response to a second voice command. The second voice command may be the additional voice command registered with the speech recognition engine and the input handler, and the second voice command may correspond to the particular semantic operation.

Identifying the one or more voice commands from the XML configuration repository may include parsing one or more XML files included in the XML configuration repository to identify the one or more voice commands.

A prompt for additional information that further specifies the particular semantic operation that is performed in response to the first voice command may be made.

Errors in the execution of the particular semantic operation that is performed in response to the first voice command may be handled with an error handler.

These general and specific aspects may be implemented using a system, a method, or a computer program, or a combination of systems, methods, and computer programs. Other features will be apparent from the description and drawings, and from the claims.

DESCRIPTION OF DRAWINGS

FIG. 4 is an illustration of one implementation of the XML file of FIG. 3.

DETAILED DESCRIPTION

In one or more implementations, a user interface to a software application or an electronic device is voice-enabled to facilitate interaction with the user interface. A user may signal for execution of a semantic operation provided by the user interface with a single voice command. A semantic operation is an operation that includes multiple smaller sub-operations, each of which may generally be executed with conventional interaction with one or more user interfaces, such as generating user input with a keyboard and a mouse. Thus, execution of a semantic operation generally requires multiple interactions and inputs. The user interface to the software application is voice-enabled without modifying the application to enable voice control of the application. More particularly, a voice extension module is used to enable voice commands to be used to signal for execution of semantic operations supported by the user interface and the software application. One or more XML files may be used to identify the semantic operations provided by the user interface and the corresponding voice commands.

In particular implementations, enabling a user to execute a semantic operation by issuing a single voice command enables the user to interact with the user interface efficiently, because the user is not required to execute individually each of the sub-operations associated with the semantic operation. Furthermore, enabling such interaction with the user interface enables the user to interact more naturally with the user interface. More particularly, the voice command may be a more natural instruction or description for the semantic operation, rather than a more technical voice command that references one or more graphical elements of the user interface. As a result, the user interface has a greater usability and accessibility than other user interfaces that are not voice-enabled, particularly for physically disabled users and other users that may have difficulty generating manual input.

The voice extension module may obviate the need to modify an application in order to support voice commands for semantic operations. As a result, existing applications may be provided with a voice extension module to voice-enable the existing applications such that semantic operations supported by the existing applications may be executed in response to a single voice command.

Figure 1A:
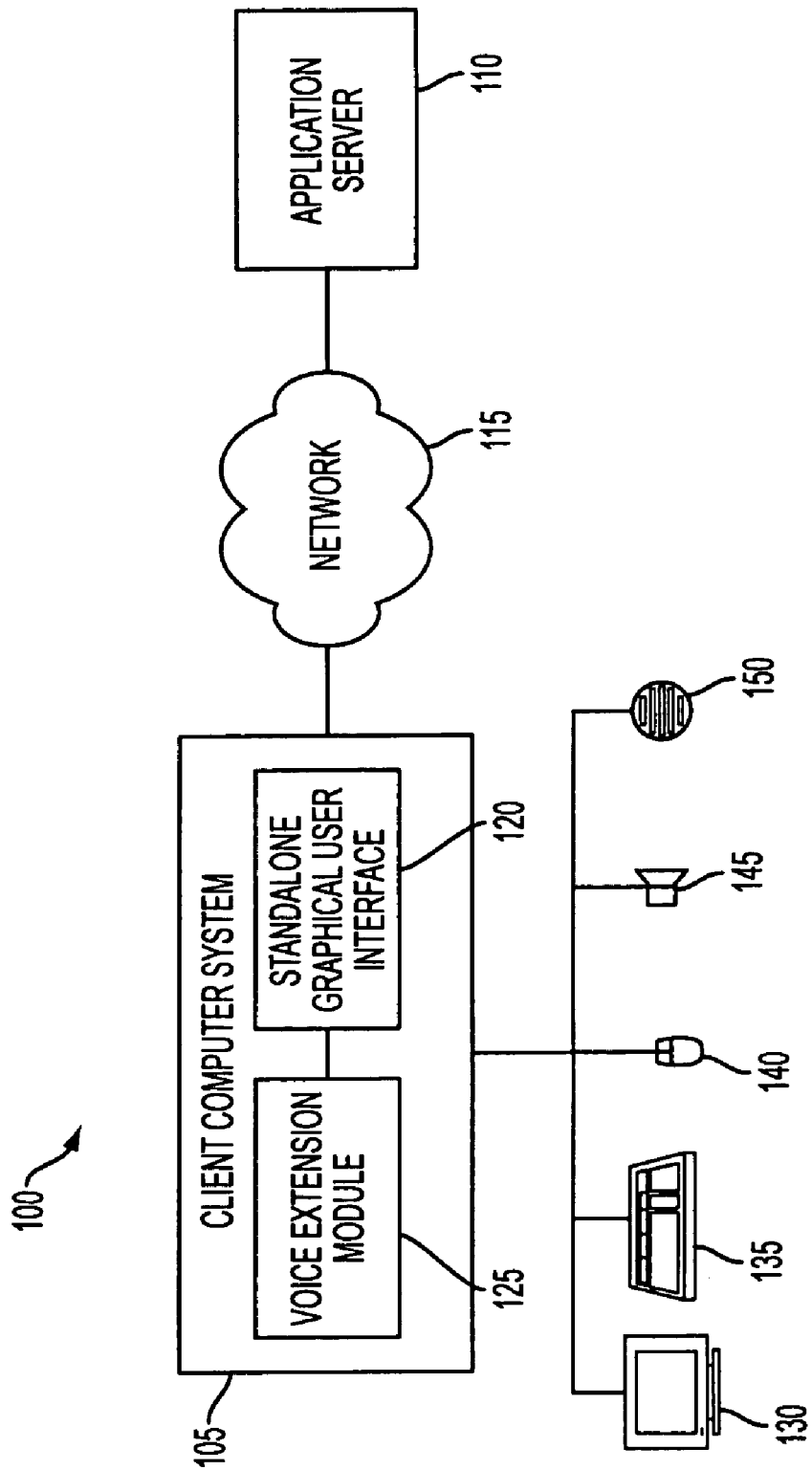
FIGS. 1A and 1B are block diagrams of voice-enabled computer applications that use a voice extension module.
Figure 1B:
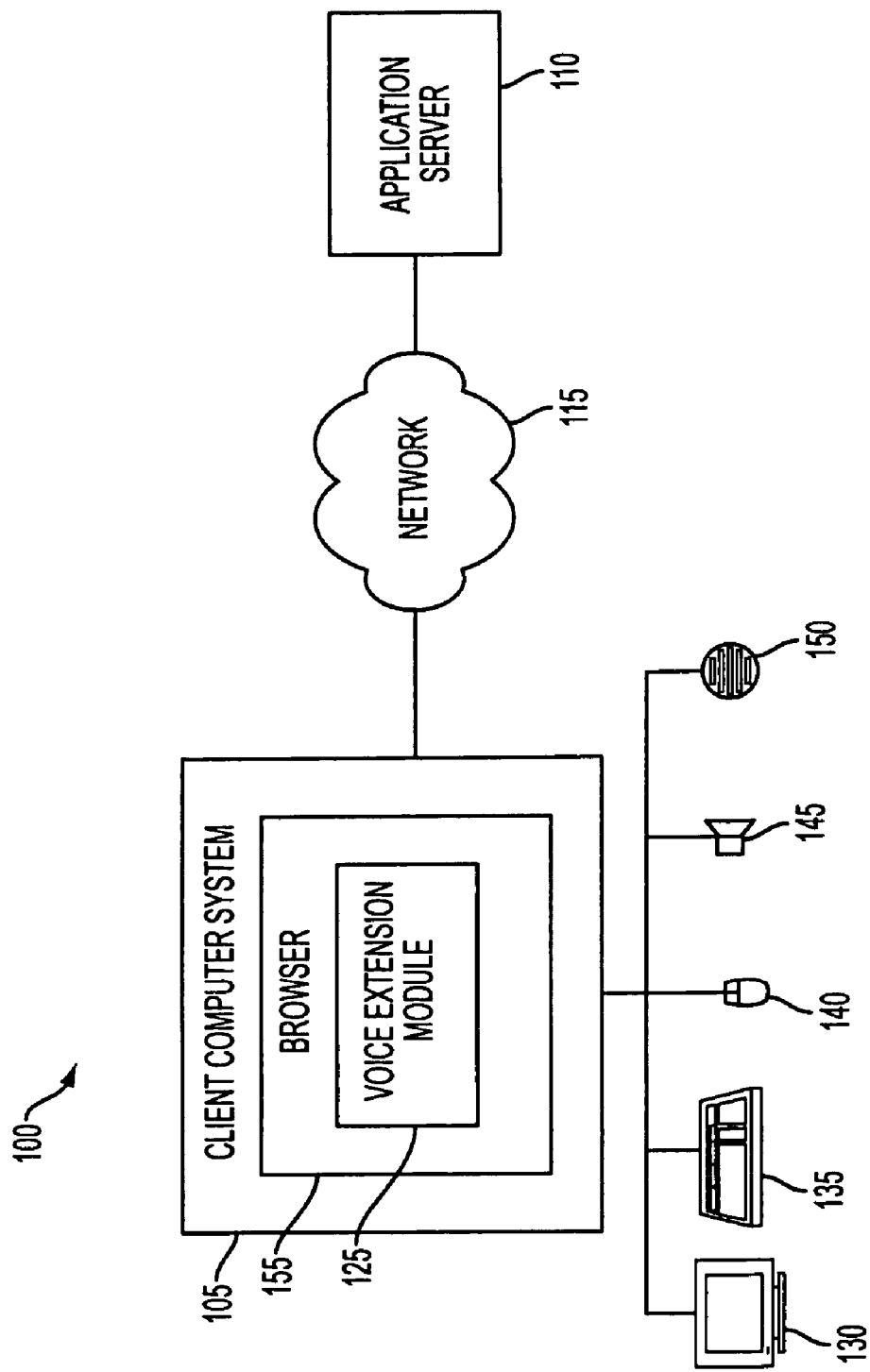

Referring to FIG. 1A, a first implementation of a voice-enabled computer interface 100 includes a client computer system 105 that enables a user to interact with an application provided by an application server 110 over a network 115. The client computer system 115 includes a standalone graphical user interface (GUI) 120 for the application, and the graphical user interface 120 communicates with a voice extension module 125. The GUI 120 enables user interaction with the application using one or more of a video display monitor 130, a keyboard 135, a mouse 140 and a speaker 145. The voice extension module 125 may receive input from a microphone 150. Referring also to FIG. 1B, a second implementation of a voice-enabled computer interface 100 includes a web browser 155 instead of the graphical user interface 120 to present a web-based user interface for the application provided by the application server 110. In such an implementation, the voice extension module 125 is included in the browser 155.

The client computer system 105 is a computer system used by a user to access and interact with an application provided by the application server 110. The client computer system 105 provides a user interface to the application that enables the user to access and interact with the application. More particularly, the client computer system 105 presents output from the application and the user interface to the user, and receives input for the application and the user interface from the user. The client computer system 105 also communicates with the application server 110 to enable the user of the client computer system 105 to monitor and control execution of the application.

The application server 110 is a computer system on which the application is executed. The application server 110 also provides access to the application to the client computer system 105. For example, the application server 110 may provide information specifying a user interface for the application to the client computer system 105. The application server 110 also may provide information to be presented to the user on the user interface to the client computer system 105. The application server 110 also may receive input generated by the user of the client computer system 105, and the received input may be used to control execution of the application.

The network 115 is a network that connects the client computer system 105 to the application server 110. For example, the network 115 may be the Internet, the World Wide Web, one or more wide area networks (WANs), one or more local area networks (LANs), analog or digital wired and wireless telephone networks (e.g. a public switched telephone network (PSTN), an integrated services digital network (ISDN), or a digital subscriber line (xDSL)), radio, television, cable, satellite, and/or any other delivery mechanism for carrying data. The client computer system 105 and the application server 110 are connected to the network 115 through communications pathways that enable communications through the network 115. Each of the communication pathways may include, for example, a wired, wireless, cable or satellite communication pathway, such as a modem connected to a telephone line or a direct internetwork connection. The client computer system 105 and the application server 110 may use serial line internet protocol (SLIP), point-to-point protocol (PPP), or transmission control protocol/internet protocol (TCP/IP) to communicate with one another over the network 115 through the communications pathways.

The GUI 120 is a standalone application that may be used to access the application executing on the application server 110. More particularly, the client computer system 105 executes the GUI 120 to enable a user to monitor and control the application. The GUI 120 may present information describing the operation of the application to the user. The GUI 120 also may enable the user to provide input that may be used to control application. For example, the user may be enabled to specify parameters or data needed by the application with the GUI 120. The GUI 120 also may include metadata describing functions provided by the GUI 120. Because the GUI 120 is a standalone application, the user interface provided by the GUI 120 is not presented within another application program executing on the client computer system 105, such as a browser.

The browser 155 is configured to receive a web-based user interface to an application received from the application server 110 over the network 115. The web-based user interface may be specified as Hypertext Markup Language (HTML) code or JavaScript code. The HTML code instructs the browser 155 to display information and to accept user input and commands. The HTML code describes various text, images, and user interface elements to be displayed to the user. The browser 155 also may receive metadata describing functions that are provided by the user interface from the application server 110. The browser 155 may be a conventional web browser, such as Internet Explorer, which is provided by Microsoft Corporation of Redmond, Wash.

In the implementation of the voice-enabled computer interface 100 illustrated in FIG. 1A, the voice extension module 125 is a standalone application in communication with the GUI 120. In another implementation of the voice-enabled computer interface 100, the voice extension module 125 may be a module within the GUI 120. In the implementation of the voice-enabled computer interface 100 illustrated in FIG. 1B, the voice extension module 125 is implemented as a Microsoft Internet Explorer Browser Helper Object (BHO) or as an Internet Explorer Toolbar Component. A BHO acts as an extension of functionality of the browser 155 and is used to intercept page and browser 155 events before action is taken. This allows the voice extension module 125 to define and control the behavior of the browser 155 environment and the way in which events (e.g., mouse clicks, key presses) are handled. In addition, a BHO allows the voice extension module 125 to respond to external events, such as when a word is spoken, by embedding a speech recognition engine into the BHO. In this implementation, any speech recognition engine (e.g., a SAPI-compliant speech recognition engine) may be used to generate speech recognition events. The Internet Explorer Toolbar Component provides the same functionality as the BHO. In addition, the Internet Explorer Toolbar Component may make the voice extension module 125 perceptible as a toolbar of the browser 155.

The voice extension module 125 is configured to recognize one or more voice commands. Each of the voice commands corresponds to a semantic operation that may be performed with a user interface provided by the GUI 120 or the browser 155. A semantic operation is an operation that includes multiple smaller sub-operations, each of which may be executed with conventional interaction with one or more user interfaces, such as generating user input with a keyboard and a mouse. For example, in an implementation where the user interface includes a text field for entering a number of units of a product to be ordered, a semantic operation may include entering a number that represents the number of units of the product to be ordered. The sub-operations included in the semantic operation include identifying the text field within the user interface, selecting the text field such that the number may be entered, and actually entering the number within the text field. The user may signal for the semantic operation by issuing a single voice command, such as, for example, "Order 10 units of the product." Such a voice command does not explicitly reference the text field that is accessed during the semantic operation, nor does it explicitly reference any one of the sub-operations that comprise the semantic operation. In other words, the voice command is a shortcut for bypassing a typically large amount of navigation and data entry required to execute the multiple sub-operations included in the semantic operation.

As another example, a semantic operation may include a switch from the user interface to a different user interface. The sub-operations included in such a semantic operation may include exiting the initial user interface, starting the different user interface, and logging into the different user interface. The user may signal for the switch by issuing a single voice command, such as, for example, "switch to the different user interface" to bypass a typically large amount of navigation and data entry that may be associated with the switch.

The voice extension module 125 may process data and metadata related to the user interface presented with the GUI 120 or the browser 155 to identify what semantic operations are supported by the user interface and what voice commands may be used to signal for execution of those semantic operations. For example, the voice extension module may identify the functions and the corresponding voice commands by parsing one or more XML files that specify the functions and the voice commands. The voice extension module 125 is configured to recognize the voice commands and to signal for execution of semantic operations corresponding to the recognized voice commands.

The client computer system 105 and the application server 110 may be implemented using, for example, general-purpose computers capable of responding to and executing instructions in a defined manner, personal computers, special-purpose computers, workstations, servers, devices, components, or other equipment or some combination thereof capable of responding to and executing instructions. The components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the components.

Further, the client computer system 105 and the application server 110 include a communications interface used to send communications through the network 115. The communications may include, for example, hypertext transfer protocol (HTTP) or HTTP over Secure Socket Layer (HTTPS) GET or POST messages, e-mail messages, instant messages, audio data, video data, general binary data, or text data (e.g., encoded in American Standard Code for Information Interchange (ASCII) format).

Figure 2:
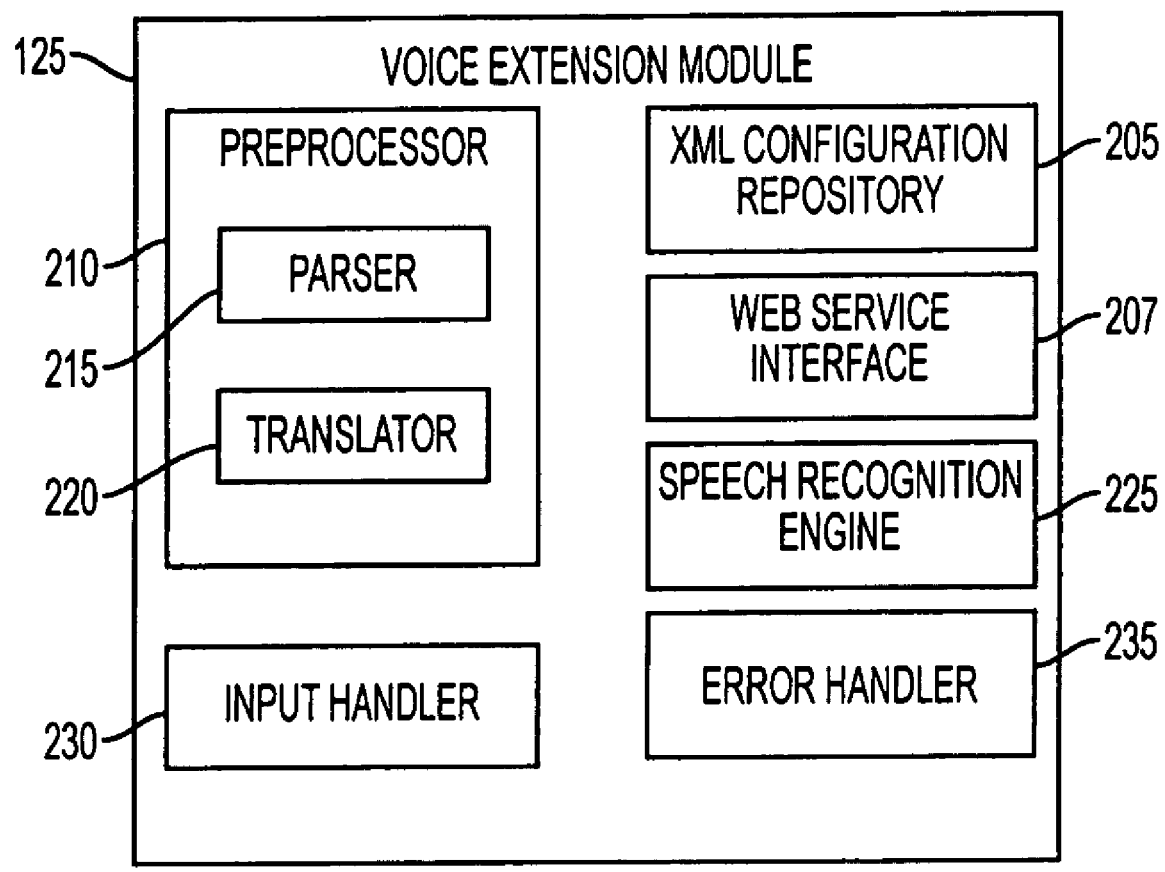
FIG. 2 is a block diagram of a voice extension module of a voice-enabled computer application.

Referring to FIG. 2, one implementation of the voice extension module 125 of FIGS. 1A and 1B includes an XML configuration repository 205, a web service interface 207, and a preprocessor 210, which includes a parser 215 and a translator 220. The voice extension module also includes a speech recognition engine 225, an input handler 230, and an error handler 235.

The XML configuration repository 205 includes one or more XML files. The XML files identify one or more semantic operations that may be performed with a user interface and one or more voice commands that may be used to signal for execution of the semantic operations. The one or more semantic operations may include one or more switches from the user interface to a different user interface. The XML files may be specified such that each voice command corresponds to at most one semantic operation. The semantic operations and switches, and the corresponding voice commands, may be categorized into one or more roles. Each role represents a type of user of the user interface, and the semantic operations that correspond to a particular role represent semantic operations typically performed by users of the particular role. The XML files may identify semantic operations and corresponding voice commands for multiple user interfaces and applications. The structure of the XML files is discussed in further detail with respect to FIGS. 3 and 4. The XML files included in the XML configuration repository 205 may be created manually or automatically, for example, based on analysis of the user interface and the corresponding application.

In some implementations, the XML files are included in the XML configuration repository 205 before the user interface is initially displayed. For example, the XML files may be included in the XML configuration repository 205 when the voice extension module 125 is installed. In other implementations, the XML files may be transferred to the voice extension module 125 when the user interface is to be displayed. For example, the web service interface 207 may receive the XML files and may store the XML files within the XML configuration repository 205. The XML files included in the XML configuration repository 205 may be modified or replaced with updated XML files that identify, for example, additional semantic operations and voice commands for the user interface.

The web service interface 207 is configured to receive the XML files stored in the XML configuration repository 205 from an external source, such as the application server 110 of FIGS. 1A and 1B or another web service from which the XML files may be accessed. In addition, the web service interface 207 may be configured to request the XML files from the external source. The request may be an HTTP request, a file transfer protocol (FTP) request, or a simple object access protocol (SOAP) request. The external source may provide the web service interface 207 with the XML files automatically when providing the user interface to the voice extension module 125, or in response to a request for the XML files from the web service interface 207. In some implementations, the web service interface 207 may store the received XML files within the XML configuration repository 205 such that the preprocessor 210 may access the XML files from the XML configuration repository 205 for processing. In other implementations, the web service interface 207 may pass the XML files directly to the preprocessor 210 for processing.

The preprocessor 210 preprocesses the XML files included in XML configuration repository 205 to enable voice control of the user interface before the user interface is presented to a user. More particularly, the preprocessor 210 preprocesses the XML files by using the parser 215 to identify semantic operations provided by the user interface. In some implementations, the parser 215 also may identify corresponding voice commands for signaling for the execution of the semantic operations from the XML files. In other implementations, the preprocessor 210 uses the translator 220 to identify the voice commands, for example, by inferring a voice command from the XML files' description of the semantic operation. In either case, the translator registers the voice commands with the speech recognition engine 225 and the input handler 230 to enable the voice commands to be recognized and the corresponding semantic operations to be executed.

As just mentioned, in some implementations the parser 215 identifies the semantic operations provided by the user interface and the voice commands that may be used to signal for execution of the semantic operations. More particularly, the parser 215 may parse the hierarchically structured XML files included in the XML configuration repository 205 using conventional parsing techniques to identify a portion of the XML files corresponding to the user interface. The identified portion may be further parsed to identify roles of users of the user interface, as well as semantic operations and voice commands that correspond to the identified roles. The semantic operations and the voice commands may be identified by traversing document object models (DOM) of the XML files. Alternatively or additionally, the semantic operations and the voice commands may be identified using a finite state machine.

In other implementations, the parser 215 identifies only the semantic operations provided by the user interface. The parser 215 may identify semantic operations by identifying sub-operations that are included in the semantic operations. The parser 215 may identify sub-operations by identifying user interface elements within the code using conventional parsing techniques. For example, user interface information in the form of an HTML web page may include various user interface elements, such as text fields, password fields, checkboxes, radio buttons, and control buttons (e.g., submit and reset). The user interface elements may be identified by traversing the DOM of the HTML web page, or by using a finite state machine. Based on the identified user interface elements, the parser 215 may identify the semantic operations. For example, the user may construct the semantic operations by combining multiple operations that may be performed using one or more of the identified user interface elements.

The parser 215 also may identify the semantic operations using metadata describing the user interface and the application. For example, the parser 215 may inspect a user manual, help and support documents, or other documentation for the user interface and the application to identify the semantic operations provided by the user interface. More particularly, the user manual may include an indication of the semantic operations that are provided by the user interface in sections that generally describe the user interface. Furthermore, other sections of the user manual may identify sub-operations included in the semantic operations. As a result, the parser 215 may use the metadata to identify the semantic operations. In some implementations, the metadata may be stored in the XML configuration repository 205 or another data store that is accessible to the parser 215.

As an alternative to identifying the semantic operations automatically, the parser 215 may access a manual specification of the semantic operations. For example, a user may identify the semantic operations manually based on knowledge of the user interface and the application for which the user interface is presented. For example, if the application is a timekeeping application, the user may manually create or define semantic operations for the user interface to the timekeeping application. Such a manually defined semantic operation may create, for example, a time entry for a particular amount of a particular type of time on a particular day. The user also may indicate the sub-operations that are included in those semantic operations. Using the previous example, the user may identify modifications made to particular user interface elements to create the time entries as the sub-operations. The parser 215 may access such indications of the semantic operations and the corresponding sub-operations to identify the semantic operations. In some implementations, the manually specified semantic operations may be stored in the XML configuration repository 205 or another data store that is accessible to the parser 215.

In other implementations in which the parser 215 identifies only the semantic operations provided by the user interface, the translator 220 may identify (e.g., infer or create) the corresponding voice commands based on indications of the semantic operations that are received from the parser 215. For example, the indications of the semantic operations may include an indication of voice commands that are appropriate for signaling for execution of the semantic operation. Alternatively or additionally, the translator 220 may identify the voice commands through inspection of the sub-operations that are included in the semantic operations. For example, if sub-operations of one of the semantic operations include identifying a text field, accessing the text field, and entering a particular value in the text field, the translator 220 may identify "enter the value in the text field" as a voice command for the semantic operation. The voice command also may identify a more generic voice command or a grammar that enables entering any value in the text field as a voice command for the semantic operation.

Alternatively or additionally, the translator 220 may access a manual specification of the voice commands. For example, when a user manually identifies the semantic operations provided by the user interface, the user may manually indicate voice commands for signaling for the semantic operations. For example, the user may identify specific voice commands or grammars for each of the semantic operations. The translator 220 may access such indications of the voice commands to identify the voice commands. In some implementations, the manually specified voice commands may be stored in the XML configuration repository 205 or another data store that is accessible to the translator 220.

Regardless of whether the parser 215 or the translator 220 identifies the voice commands corresponding to the semantic operations identified by the parser 215, the translator 220 registers the voice commands with the speech recognition engine 225 and the input handler 230. In one implementation, the translator 220 registers at least one voice command for each of the semantic operations. The translator 220 registers the voice commands such that each voice command corresponds to only one semantic operation. The translator 215 receives an indication of the voice commands from the parser 215. Registering the voice commands with the speech recognition engine 225 and the input handler 230 enables the voice commands to be handled properly when recognized.

The translator 220 may register the voice commands for a semantic operation as one or more command and control grammars from which specific commands may be recognized, or as one or more context free or natural language grammars from which multiple natural language phrases may be recognized. A grammar is a specification of words and/or expected patterns of words to be listened for by the speech recognition engine 225. Using command and control grammars significantly increases the accuracy and efficiency of voice input. This is because it is much easier to recognize which of a small number of words identified in a grammar was spoken than to determine which of a very large number of possible words was spoken.

Specifying the voice commands in command and control grammars requires that the user remembers the semantic operations provided by the user interface and the voice commands from the command and control grammars that correspond to the semantic operations in order to signal for execution of the semantic operations. On the other hand, natural language grammars provide for an easier interaction by enabling natural language phrases to signal for execution of a semantic operation. Therefore, the user is not required to remember specific voice commands. Instead, the user only needs to remember the semantic operations, and the user may signal for execution of the semantic operations by issuing natural language phrases that correspond to the semantic operations. In a well defined natural language grammar, the natural language phrases that may be recognized represent voice commands that the user would naturally identify for the semantic operations. As a result, the user may signal for execution of a semantic operation without issuing a specific voice command that corresponds to the semantic operation.

The translator 220 may cause the user interface to be modified before being presented to the user, in order to make the user interface more "voice-friendly." For example, translator 220 may add identifiers to elements of the user interface. Some elements may include XML data or other metadata that indicates an appropriate identifier for the element. This metadata may determine an appropriate identifier that may be added to the element to make it more voice-friendly. Additionally, some identifiers of user interface elements may be abbreviated. One way to shorten long identifiers is to register only a portion of the long identifier. For example, if the identifier is "Submit Changes for Processing," it can be shortened to "Submit Changes" or "Submit."

The speech recognition engine 225 recognizes voice commands that have been previously registered by the translator 220. More particularly, when a user of the user interface speaks, the speech recognition engine 225 parses the speech to identify one of the registered voice commands. The speech recognition engine 225 may use a grammar identified by the translator 220 to enhance its ability to recognize specific combinations of spoken words and phrases as previously registered voice commands. When a voice command is recognized, the speech recognition engine 225 generates an indication of the recognized voice command. The indication of the recognized voice command is passed to the input hander 230. In one implementation, the speech recognition engine 225 is ViaVoice provided by International Business Machines of Armonk, N.Y. In another implementation, the speech recognition engine 225 is the Speech Recognition Engine provided by Microsoft Corporation of Redmond, Wash.

The input handler 230 maintains a mapping of voice commands to semantic operations to be executed in response to the voice commands. The translator 220 registers the voice commands and the corresponding semantic operations with the input handler such that a semantic operation corresponding to a recognized voice command may be executed. When an indication of a recognized voice command is received, the input handler 230 identifies the voice command that has been recognized. The input handler 230 uses the mapping to identify the semantic operation corresponding to the recognized voice command, and signals for execution of the identified semantic operation with the user interface. Prior to doing so, the input handler 230 may save information describing a current state of the user interface, such that, for example, the semantic operation may be undone. The input handler 230 also may signal for the execution of any additional tasks, as defined by the behavior of the user interface or visual focusing used in the overall user interface strategy. The input handler 230 helps to ensure that consistent action is taken regardless of whether the semantic operation is executed with a mouse or a keyboard, or in response to an equivalent voice command.

The error handler 235 handles errors in the execution of a semantic operation for which a voice command has been received. For example, the error handler 235 may determine that additional information is needed to execute the semantic operation. The error handler 235 may cause the user to be prompted for the additional information such that the semantic operation may be executed. The error handler 235 also may detect other faults in the execution of the semantic operation. The error handler 235 may correct the faults, stop and undo execution of the semantic operation, or otherwise enable use of the user interface to continue.

In addition, the error handler 235 may cause feedback to be displayed on the user interface to notify the user that the semantic operation has been executed. For example, graphical elements of the user interface that have been modified as a result of the semantic operation may be highlighted with, for example, a colored border or another visual identifier, such that those graphical elements are clearly visible to the user. In addition, the error handler 235 may signal for an audio message to be presented to the user with a speaker of the client computer system, such as the speaker 145 of FIGS. 1A and 1B. The audio message may indicate that the semantic operation has been executed, or otherwise may identify and describe the semantic operation. The audio message may be a pre-recorded sound or audio generated by a text-to-speech (TTS) system.

Figure 3:
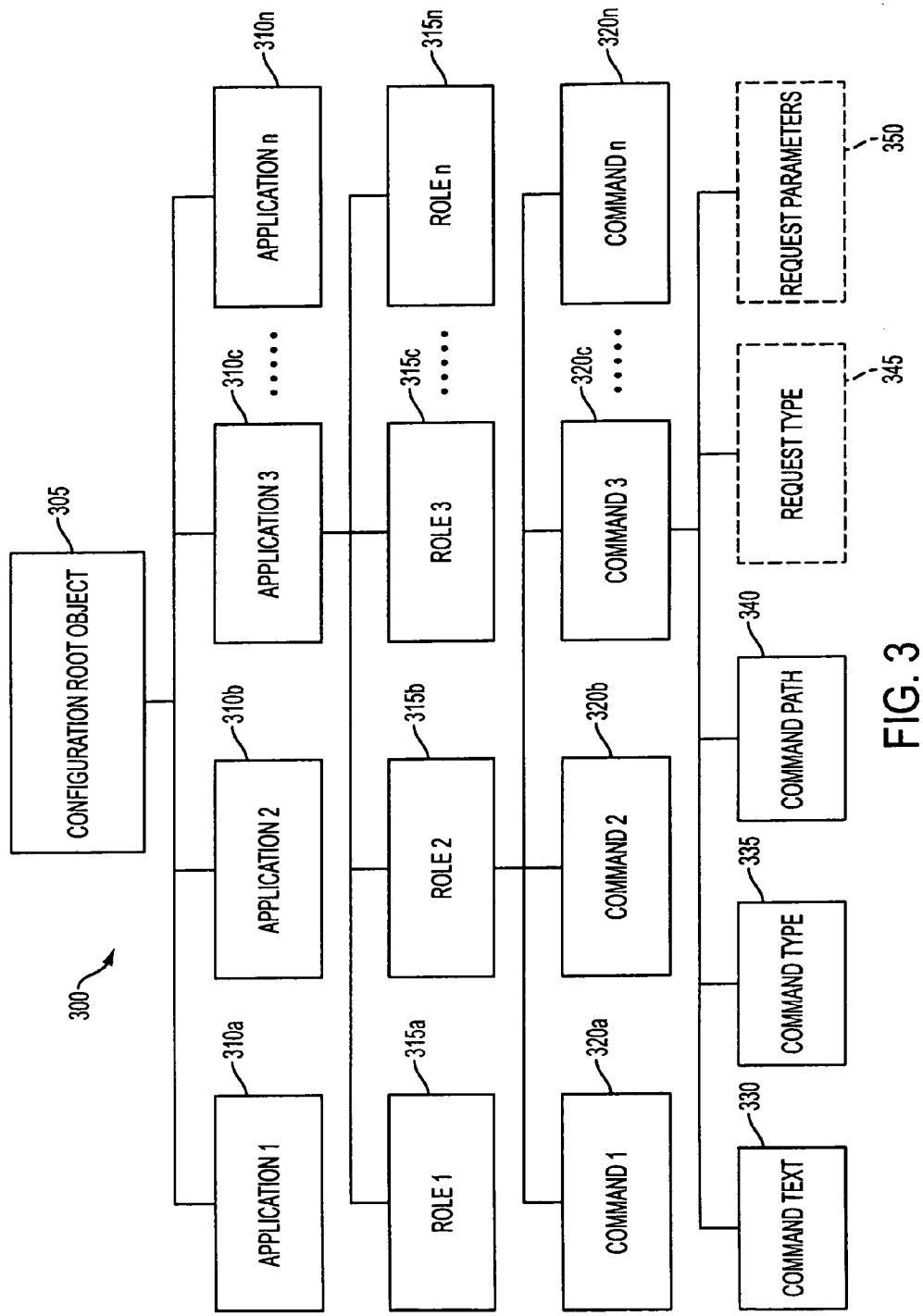
FIG. 3 is a block diagram of an XML file specifying voice commands for controlling a voice-enabled computer application.

Referring to FIG. 3, an XML file structure 300 indicates the structure of one or more XML files that may be stored within an XML configuration repository, such as the XML configuration repository 205 of FIG. 2. In some implementations, the XML file structure 300 may be referred to as an XML schema for the XML files. The XML file structure 300 includes a configuration root object 305, one or more application objects 310a-310n, one or more role objects 315a-315n, and one or more command objects 320a-320n. Each command object 320a-320n includes a command text 330, a command type 335, and a command path 340, and also may include a request type 345, and request parameters 350. Each of the objects included in the XML file structure 300 may include a name and an identifier to uniquely identify the object.

The configuration root object 305 is a root object for the XML file structure 300. In the illustrated implementation, the XML file structure 300 includes exactly one root object 305, and the root object 305 serves as a base for the structure of the XML file structure 300. All other objects included in the XML file structure 300 are included directly or indirectly within the root object 305.

The root object 305 includes one or more application objects 310a-310n. Each of the application objects 310a-310n represents an application with which a user may interact. More particularly, a user interface for an application represented by one of the application objects 310a-310n may be presented to the user with a GUI or a browser associated with the XML configuration repository, such as the GUI 120 of FIG. 1A or the browser 155 of FIG. 1B. The applications corresponding to the application objects 310a-310n may be any application that may be accessed from an application server with which the GUI or the browser communicates, such as the application server 110 of FIGS. 1A and 1B. For example, the applications may include an electronic time sheet application, a leave request application, an employee self service application, and a business warehouse application. The user may manipulate the presented user interface to perform one or more semantic operations provided by the user interface.

Each of the application objects 310a-310n includes one or more role objects. For example, in the illustrated XML file structure 300, the application object 310c includes role objects 315a-315n. Each of the role objects 315a-315n represents a role that the user may assume when interacting with a corresponding application. Users of a particular role typically perform particular actions when interacting with a particular application. For example, if the application object 310c corresponds to an electronic time sheet application, the roles corresponding to the role objects 315a-315n may include an employee that uses the electronic time sheet application to create time entries, or a manager that uses the electronic time sheet application to review time entries. As another example, if the application 310c corresponds to a business warehouse application, one of the roles corresponding to the role objects 315a-315n may correspond to a manager that uses the business warehouse application to generate financial reports for, for example, a first quarter of a current fiscal year.

Each of the role objects 315a-315n includes one or more command objects. For example, in the illustrated XML file structure 300, the role object 315b includes command objects 320a-320n. Each of the command objects 320a-320n represents a voice command for a semantic operation typically performed by users of a role that corresponds to the role object 315b. Each of the command objects 320a-320n includes one or more objects or fields specifying the corresponding voice command and semantic operation. For example, in the illustrated XML file structure 300, the voice command object 320c includes the command text 330, the command type 335, and the command path 340. The command object 320c also may include the request type 345 and the request parameters 350.

The command text 330 indicates one or more voice commands that may be used to signal for execution of the semantic operation corresponding to the command object 320c. The command text 330 may include one or more actual voice commands or one or more grammars from which the actual voice commands may be recognized. Alternatively or additionally, the command text 330 may include a reference to a location from which the voice commands or the grammars may be retrieved. For example, the command text 330 may specify the location of a file in which the voice commands or the grammars are specified.

The command type 335 identifies a type of the voice command corresponding to the command object 320c. The command type 335 may indicate that the voice command is an application command for a semantic operation that simply uses the application corresponding to the command object 320c. Alternatively, the command type 335 may indicate that the voice command causes a switch from the application corresponding to the command object 320c to a different application. After the switch, voice commands corresponding to the different application may be issued to execute semantic operations corresponding to the different application.

The command path 340 specifies the semantic operation corresponding to the command object 320c. The semantic operation indicated by the command path 340 is executed in response to recognition of a voice command that is indicated by the command text 330. In implementations where the user interface to the application is presented in a browser, the command path 340 may indicate one or more uniform resource locators (URLs) to be loaded into the browser in response to the voice command. Loading the URLs into the browser may cause the appearance of the user interface to be modified, thereby causing the semantic operation to be executed. In implementations where the user interface is a standalone application, the command path 340 may indicate one or more methods or functions of the standalone application to be executed in response to the voice command. Each of the one or more URLs or methods indicated in the command path 340 may represent a sub-operation included in the semantic operation corresponding to the command object 320c.

The command object 320c also may include a request type 345. The request type 345 is typically included in the XML file structure 300 in implementations where the user interface is presented to the user in a browser. The request type 345 indicates one or more types of actions performed when loading the URLs specified in the command path 340. For example, the request type 345 may indicate that the actions are HTTP GET actions, HTTP POST actions, HTTPS GET actions, HTTPS POST actions, FTP actions, or SOAP actions.

The request parameters 350 indicate one or more parameters for which the user may be prompted to provide values. The values provided by the user may enable execution of the semantic operation. For example, if the application is an electronic time sheet application, the semantic operation specified by the command path 340 may cause a time entry to be created when a voice command specified by the command text 330 is recognized. The request parameters 350 may indicate that the user should be prompted for an amount of time to be entered in the time entry. User specification of the amount of time may enable the time entry to be created.

In some implementations, one or more of the command objects 320a-320n may correspond to switches from a user interface corresponding to the application object 310c to other user interfaces corresponding to the application object 310c, or to others of the application objects 310a-310n. In such an implementation, the command text 330 may indicate one or more voice commands for signaling for the switch, and the command path 340 may identify the user interface to which a switch is to be made. For example, the command path 340 may indicate a URL to be loaded or a function to be called in order to switch to the different user interface. The command path 340 also may specify a semantic operation to be performed with the different user interface once the switch to the different user interface has been completed.

Referring to FIG. 4, an XML file 400 conforms to the structure of the XML file structure 300 of FIG. 3. The objects from the XML file structure 300 are delimited in the XML file 400 with tags that include the names of the objects. The indentation of the XML file 400 indicates the relationships between the delimited objects. The XML file 400 specifies voice commands for signaling for semantic operations provided by two applications, an "Employee Self Service" application and a "Business Warehouse" application.

The XML file 400 specifies voice commands and semantic operations corresponding to two roles for the "Employee Self Service" application. More particularly, the XML file 400 indicates that the command "available vacation" retrieves an amount of vacation available for an employee, and that the voice command "time sheet" enables the employee to create time entries. The XML file 400 also indicates that the voice command "employee year end review" enables a manager to review the time entries of an employee for a particular year.

In addition, the XML file 400 specifies a voice command and a semantic operation corresponding to a role for the "Business Warehouse" application. More particularly, the XML file 400 indicates, for the role of a manager, that the voice command "financial reports for first quarter" generates a financial report for a first quarter of a particular year.

Figure 5:
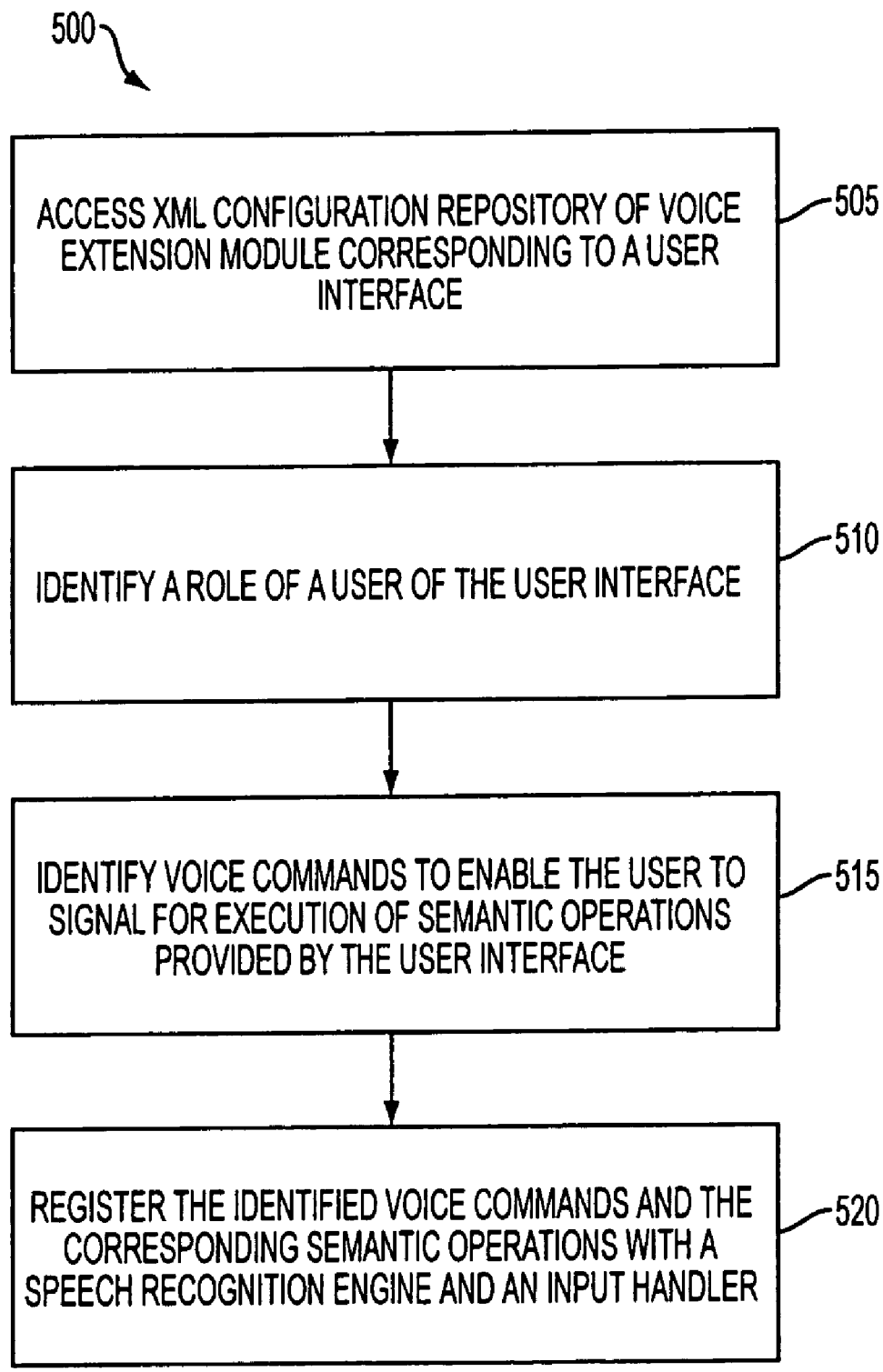
FIG. 5 is a flow chart of a process for registering voice commands that may be used to control a voice-enabled computer application.

Referring to FIG. 5, a process 500 is used to voice-enable a user interface. More particularly, the process 500 is used to register one or more voice commands for signaling for execution of a semantic operation provided by the user interface. The user interface may be the graphical user interface 120 of FIG. 1A or a user interface presented in the browser 155 of FIG. 1B. The process 500 is executed by a voice extension module, such as the voice extension module 125 of FIGS. 1A, 1B, and 2. More particularly, the process 500 is executed by a preprocessor of the voice extension module, such as the preprocessor 210 of FIG. 2. The process 500 is described below for an implementation in which a preprocessor performs the process 500, although the process 500 may be performed by one or more other devices rather than a preprocessor.

The preprocessor first accesses at least one XML file from an XML configuration repository of the voice extension module, such as the XML configuration repository 205 of FIG. 2 (505). More particularly, a parser of the preprocessor, such as the parser 215 of FIG. 2, accesses the XML file from the XML configuration repository. Alternatively or additionally, the preprocessor may access the XML file from a web service interface, such as the web service interface 207, that received the XML file from an external source, such as an application server or another web service.

The XML file indicates one or more voice commands that may be issued by users corresponding to one or more roles to signal for execution of one or more semantic operations provided by the user interface. The preprocessor identifies a role of a user of the user interface (510). More particularly, the parser identifies the role. The role may be indicated by information stored on or entered into a computer system on which the voice extension module operates. For example, the user may log into the computer system as an employee, which may indicate that the role of the user is "employee" for the parser. As another example, an authentication application operating the computer system may issue a certificate that indicates the role of the user, and the parser may identify the role from the certificate. Alternatively or additionally, the computer system may be designated as used only by users of a particular role, so the parser may assume that the role of the user is the particular role. The parser may use other configuration information or information identifying the user to identify the role.

The preprocessor identifies voice commands that enable the user to signal for execution of the semantic operations provided by the user interface (515). More particularly, the parser parses the XML file to identify the voice commands and the semantic operations corresponding to the identified role.

The preprocessor registers the identified voice commands and the identified semantic operations with a speech recognition engine and an input handler (520). More particularly, the parser provides to a translator of the preprocessor, such as the translator 215 of FIG. 2, indications of the voice commands and the corresponding semantic operations. The translator registers the identified voice commands with a speech recognition engine, such as the speech recognition engine 225 of FIG. 2. Registering the voice commands with the speech recognition engine enables the voice commands to be recognized such that the corresponding semantic operations may be executed. In addition, the translator registers the voice commands and the semantic operations with an input handler, such as the input handler 230 of FIG. 2. Registering the voice commands and the semantic operations, with the input handler may include enabling the input handler to identify and to signal for execution of a semantic operation for which a corresponding voice command was recognized. Once the identified voice commands have been registered, the user interface may be displayed.

In some implementations of the process 500, the preprocessor may not identify the role of the user of the user interface (510), for example, when information indicating the role is unavailable. In such implementations, the preprocessor identifies voice commands for all roles associated with the user interface (515). In addition, the preprocessor registers the identified voice commands, and the corresponding semantic operations, with the speech recognition engine and the input handler (520).

Figure 6:
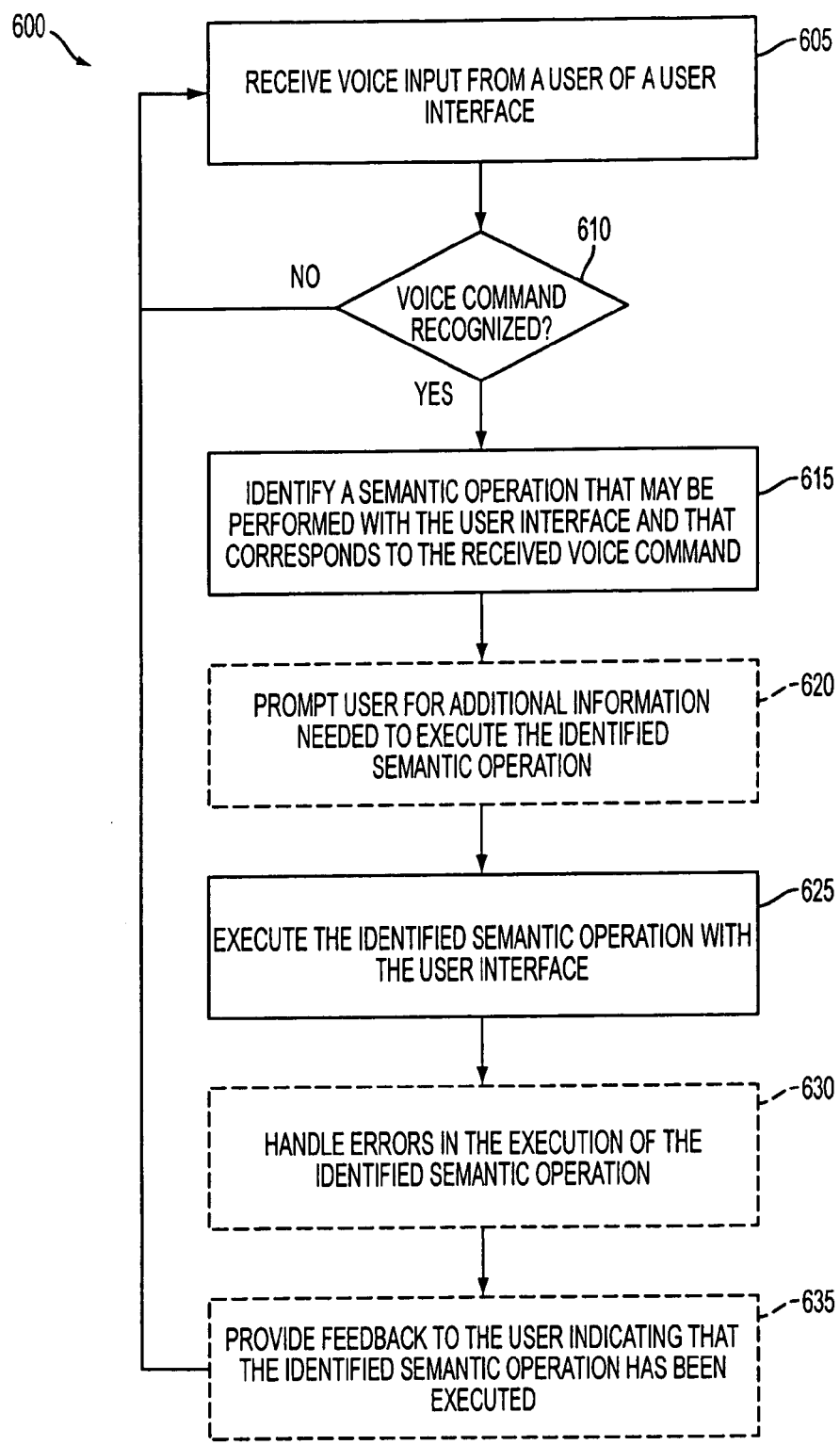
FIG. 6 is a flow chart of a process for controlling a voice-enabled computer application in response to a voice command.

Referring to FIG. 6, a process 600 is used to control a voice-enabled user interface in response to voice input from a user. The user interface may be the graphical user interface 120 of FIG. 1A, or a user interface presented in the browser 155 of FIG. 1B. The user interface may have been voice-enabled as a result of the execution of the process 500 of FIG. 5. The process 600 is executed, in several implementations, by a voice extension module, such as the voice extension module 125 of FIGS. 1A, 1B, and 2. More particularly, in at least one implementation, the process 600 is executed by a speech recognition engine, an input handler, and an error handler of the voice extension module, such as the speech recognition engine 225, the input handler 230, and the error handler 235 of FIG. 2.

The process 600 begins when the voice extension module receives voice input from a user of the user interface (605). The user may generate the voice input by speaking into a microphone of a client computer system on which the user interface is displayed, such as the microphone 150 of the client computer system 105 of FIGS. 1A and 1B. The client computer system provides the voice input received from the microphone to the voice extension module, which provides the voice input to the speech recognition engine.

The speech recognition engine determines whether the voice input is recognized as a voice command for a semantic operation (610). In other words, the speech recognition engine parses the voice input to determine whether a portion of the voice input represents a voice command that was registered with the speech recognition engine during the process 500 of FIG. 5 that was used to voice-enable the user interface.

If a voice command is recognized from the voice input, then the speech recognition engine passes an indication of the recognized voice command to the input handler. The input handler identifies a semantic operation that may be performed with the user interface that corresponds to the received voice command (615). The semantic operation may be identified from a mapping of voice commands to semantic operations that is maintained by the input handler.

The error handler may prompt the user for additional information needed to execute the identified semantic operation (620). For example, the recognized voice command may sufficiently identify a semantic operation, but the recognized voice command may not adequately enable the semantic operation to be executed. For example, the recognized voice command may not include values for parameters needed to execute the semantic operation. In order to fully specify the identified semantic operation, the input handler may prompt the user for additional voice input that includes other information necessary for specifying the semantic operation. In response to the prompt, the user provides the requested voice input in the same manner as voice input was previously provided. The speech recognition engine may recognize the necessary information from the requested voice input and may pass the recognized information to the input handler. As a result, the input handler has information that fully specifies the identified semantic operation. Such interaction in which the user is prompted for additional information may be referred to as a mixed-initiative interaction.

The input handler executes the identified semantic operation with the user interface (625). The input handler may maintain an indication of sub-operations that correspond to the identified semantic operation, and the input handler may signal for the execution of each of the sub-operations included in the identified semantic operation. The input handler may use the information requested from the user when signaling for the execution of the sub-operations. Prior to executing the sub-operations, a current state of the user interface may be recorded such that, for example, the semantic operation may be undone.

The error handler may handle any errors in the execution of the identified semantic operation (630). The error handler may correct the errors to enable execution of the identified semantic operation to continue and to complete. Alternatively, the error handler may determine that the error may not be recovered from. As such, the error handler may stop execution of the identified semantic operation. In addition, the error handler may undo any changes made to the user interface as a result of a portion of the semantic that has already been executed. As a result, the user interface is returned to the same state as before execution of the identified semantic operation began.

The error handler also may provide feedback indicating that the identified semantic operation has been executed to the user (635). In one implementation, the input handler may signal for one or more user interface elements that were modified as a result of executing the identified semantic operation to be highlighted. In another implementation, the input handler may signal for an audio message indicating that the semantic operation has been executed to be presented to the user. The audio message may be a pre-recorded sound or audio generated by a text-to-speech (TTS) system.

After the semantic operation has been executed (630), or if a voice command was not recognized from the input received from the user (610), the voice extension module listens for additional voice input from the user such that additional semantic operations may be executed. In this manner, the voice extension module enables voice commands to be processed at any time another voice command is not being processed, such that the user may issue repeated voice commands to interact with the user interface.

Figure 7:
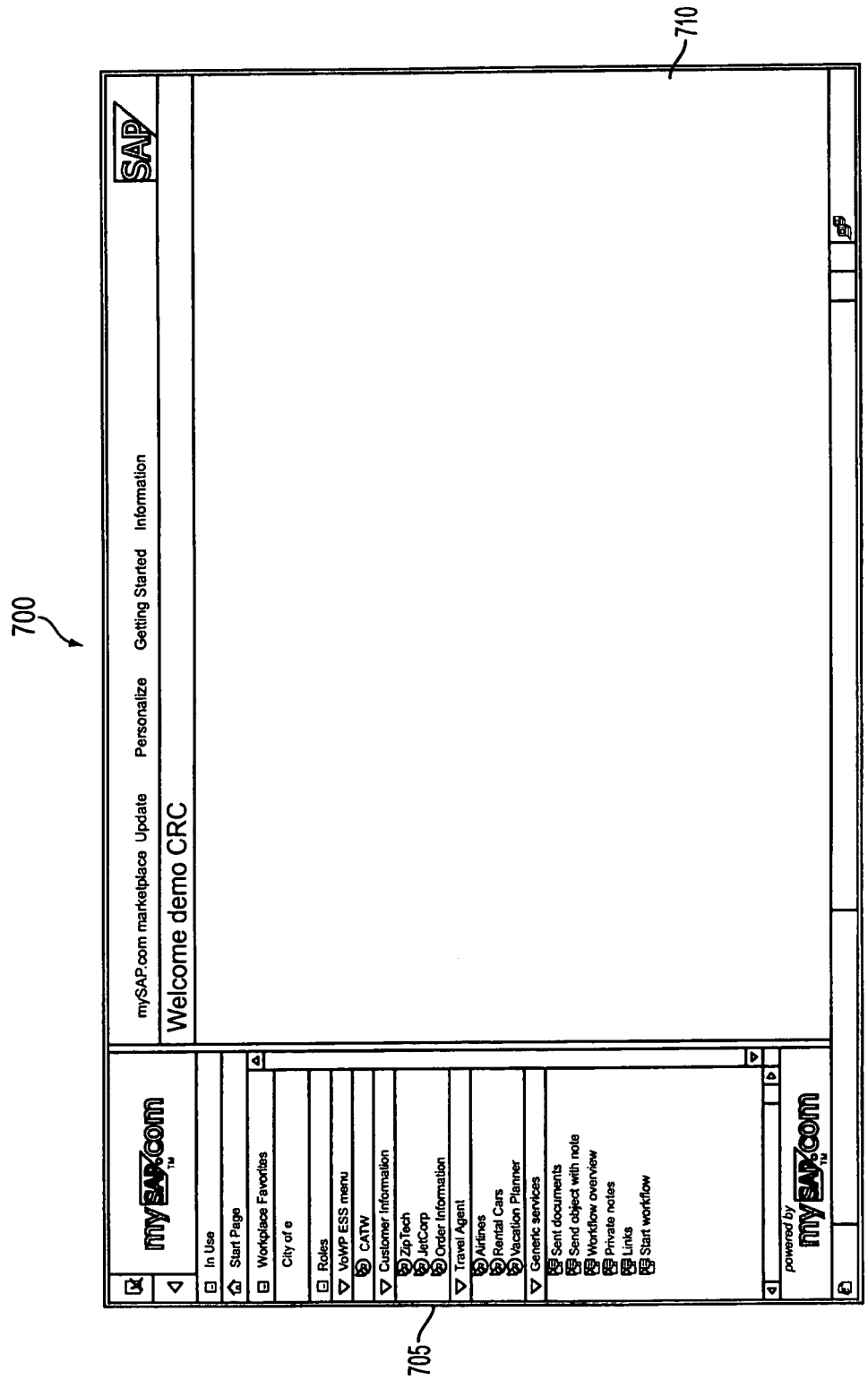
FIGS. 7-10 are screen shots of a user interface for a voice-enabled computer application.
Figure 8:
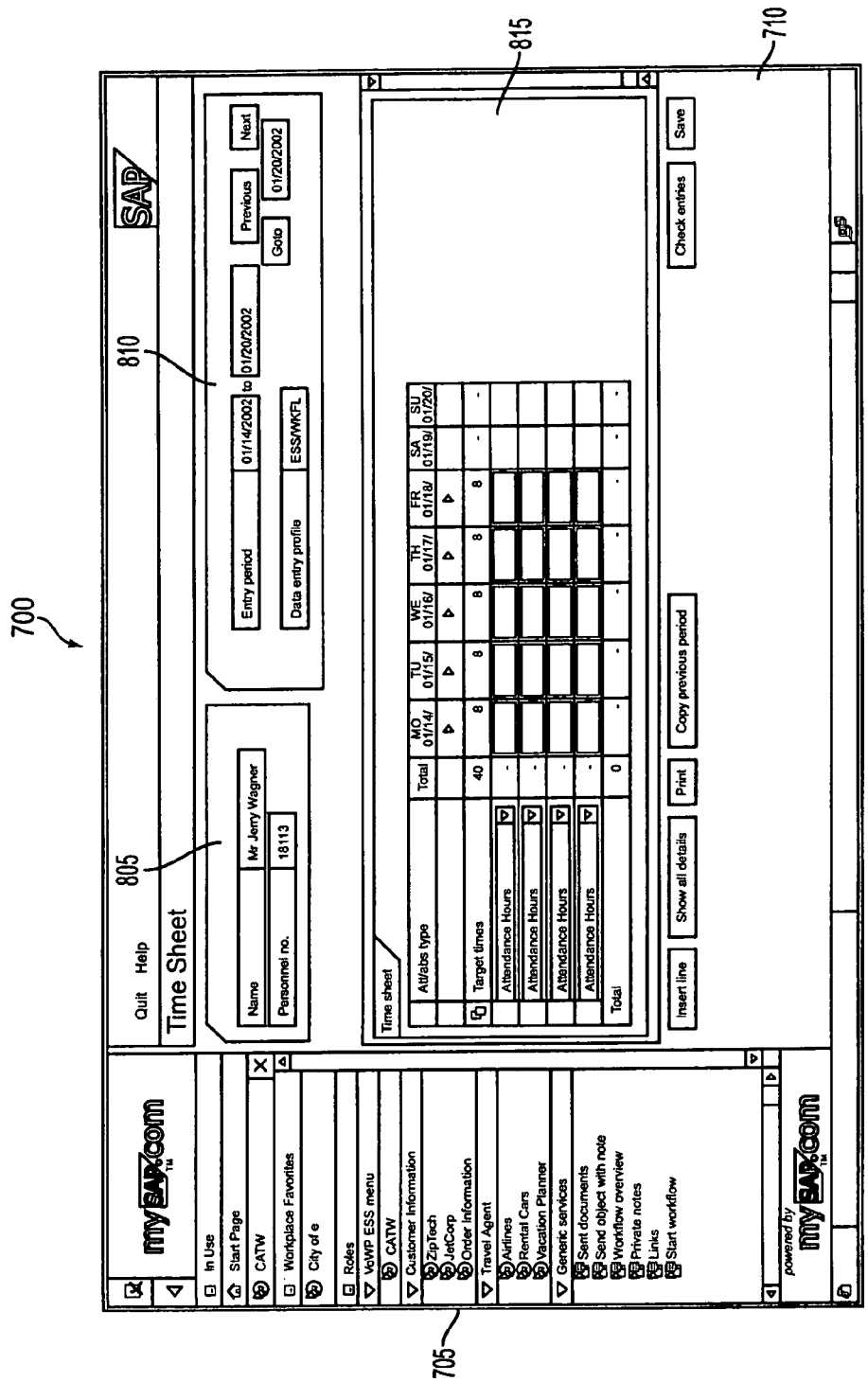

FIGS. 7-10 describe a voice-enabled electronic timekeeping application in which single voice commands may be issued to signal for the execution of semantic operations that include multiple sub-operations. Referring to FIG. 7, a web portal allows a user to select various applications. The application window 700 includes two screen areas: a menu area 705 listing the various applications and a display area 710. The menu 705 is subdivided into several areas including a "Roles" area allowing a user to select tasks based on several indicated roles. The application begins with the focus area set to the "Roles" menu. The focus area may be indicated by a visual cue such as, for example, a colored line surrounding the focus area. The user may select to begin the electronic timekeeping application (named "CATW") by speaking "CATW." This command initiates the application using display area 710 as shown in FIG. 8.

Referring to FIG. 8, the electronic timekeeping application includes three general components that are displayed in display area 710. These components include the following: a user identification component 805, a time period component 810, and a time entry component 815. The user identification component 805 lists the user's name and personnel number. The time period component 810 lists the displayed time period and allows the user to switch to other time periods. The time entry component 815 allows a user to modify and/or enter time for the time period indicated by the time period component 810. The visual cue is moved to the display area 710 indicating that this area now has priority for command interpretation.

The time entry component 815 includes what looks like a spreadsheet with columns indicating the days in the time period and rows indicating various categories of time entry, such as, for example, annual leave, attendance hours, business trip, compensation flex time, compensation overtime, education/training, family medical leave, holiday, jury duty, long term disability, meeting, personal time, severance pay, or short term disability. Various text fields corresponding to each row/column combination are available for data entry.

Figure 9:
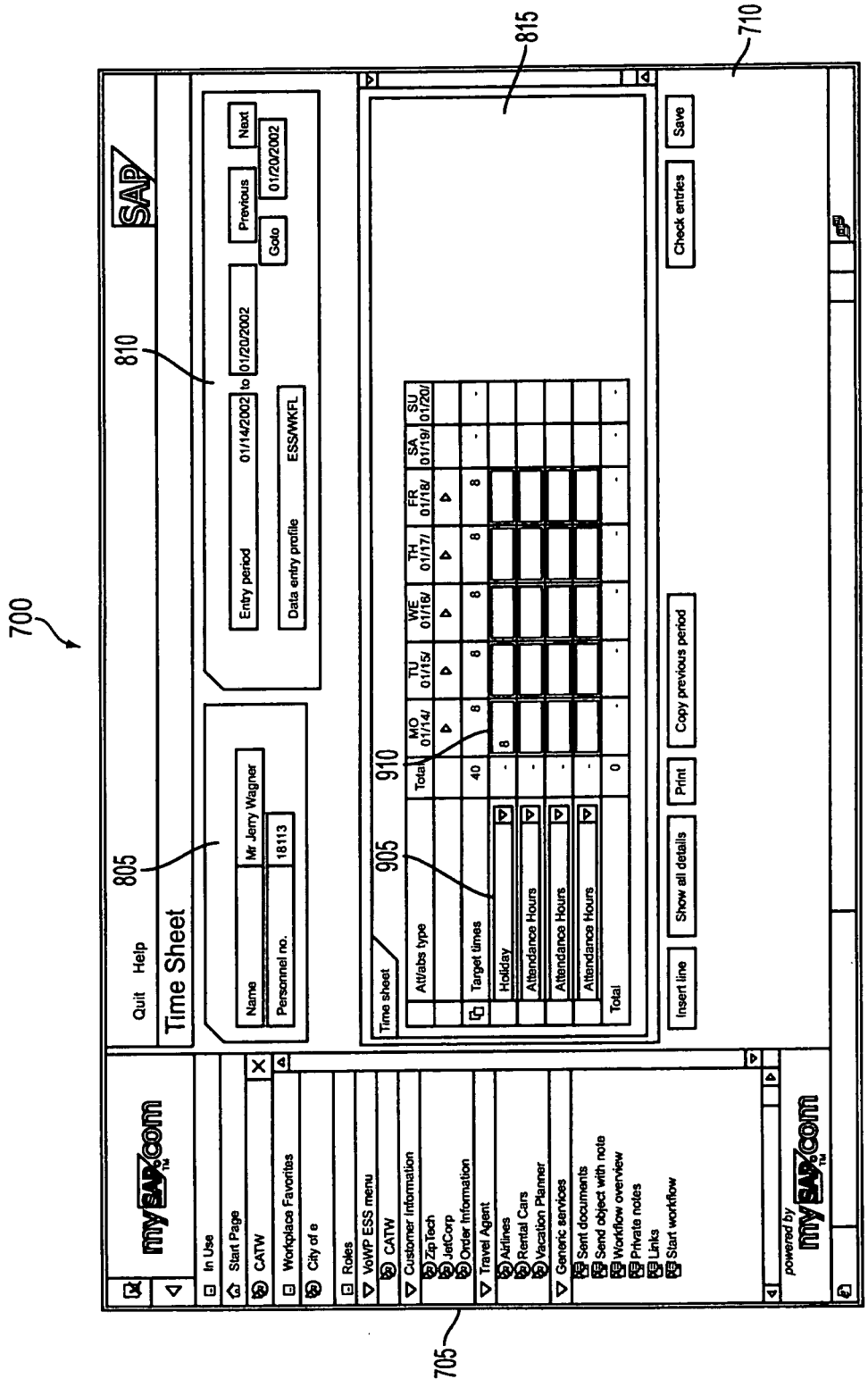

Referring to FIG. 9, a user may desire to enter 8 hours of holiday time for the first day of the time period displayed in the time entry component 815. Such an operation is a semantic operation because the operation involves the sub-operations of entering the amount of time in a text field corresponding to the first day and specifying that the time is holiday time with a selection list associated with the text field. The user may say "enter 8 hours of holiday time for the first day," or another similar command that has been registered previously as corresponding to the semantic operation, to signal for execution of the semantic operation. In response to the command from the user, "holiday" is selected from the selection list 905, and "8" is entered into the text field 905. In other words, the entire semantic operation was executed in response to the single voice command issued by the user.

In some implementations, visual feedback may be provided to the user to indicate that the semantic operation has been executed. For example, as illustrated, the selection list 905 and the text field 910 have been outlined to draw the user's attention to the fact that the selection list 905 and the text field 910 have been modified as a result of the execution of the semantic operation. In typical implementations, the visual feedback provided to the user is associated positionally with elements of the user interface that are modified in response to the voice command. In some implementations, the visual feedback that is provided to a user may depend on the semantic operation that has been executed. For example, if the selection list 905 and the text field 910 may be modified as a result of the execution of two distinct semantic operations, the selection list 905 and the text field 910 may be outlined with a first color when modified as a result of the first semantic operation and with a second color when modified as a result of the second semantic operation. As a result, the visual feedback identifies the semantic operation that was executed. In addition, an audio message indicating that the semantic operation has been executed may be presented to the user.

In some implementations, the user may provide an ambiguous, unclear, or incomplete voice command for the semantic operation. In other words, the voice command may correspond to zero or more than one semantic operations. In such implementations, the user may be prompted to provide additional information such that the ambiguity may be resolved, or such that the voice command may be clarified or completed. For example, the user simply may say "Enter 8 hours for the first day." Such a voice command does not identify a type of time to be entered for the first day. As a result, the user may be prompted to specify a type for the time to be entered for the first day, and the user may say or otherwise indicate that the time is holiday time. As another example, the user may say "enter 8 hours of holiday time," which does not identify a day on which the holiday time is to be entered. The user may be prompted to specify a day on which the holiday time is to be entered, and the user may say or otherwise indicate that the time is to be entered on the first day. Once the clarification is received from the user, the semantic operation corresponding to the clarified voice command may be executed. More particularly, the selection list 905 and the text field 910 may be modified to indicate that 8 hours of holiday time has been entered for Monday. Visual and audio feedback may be provided to indicate that the semantic operation has been executed.

Figure 10:
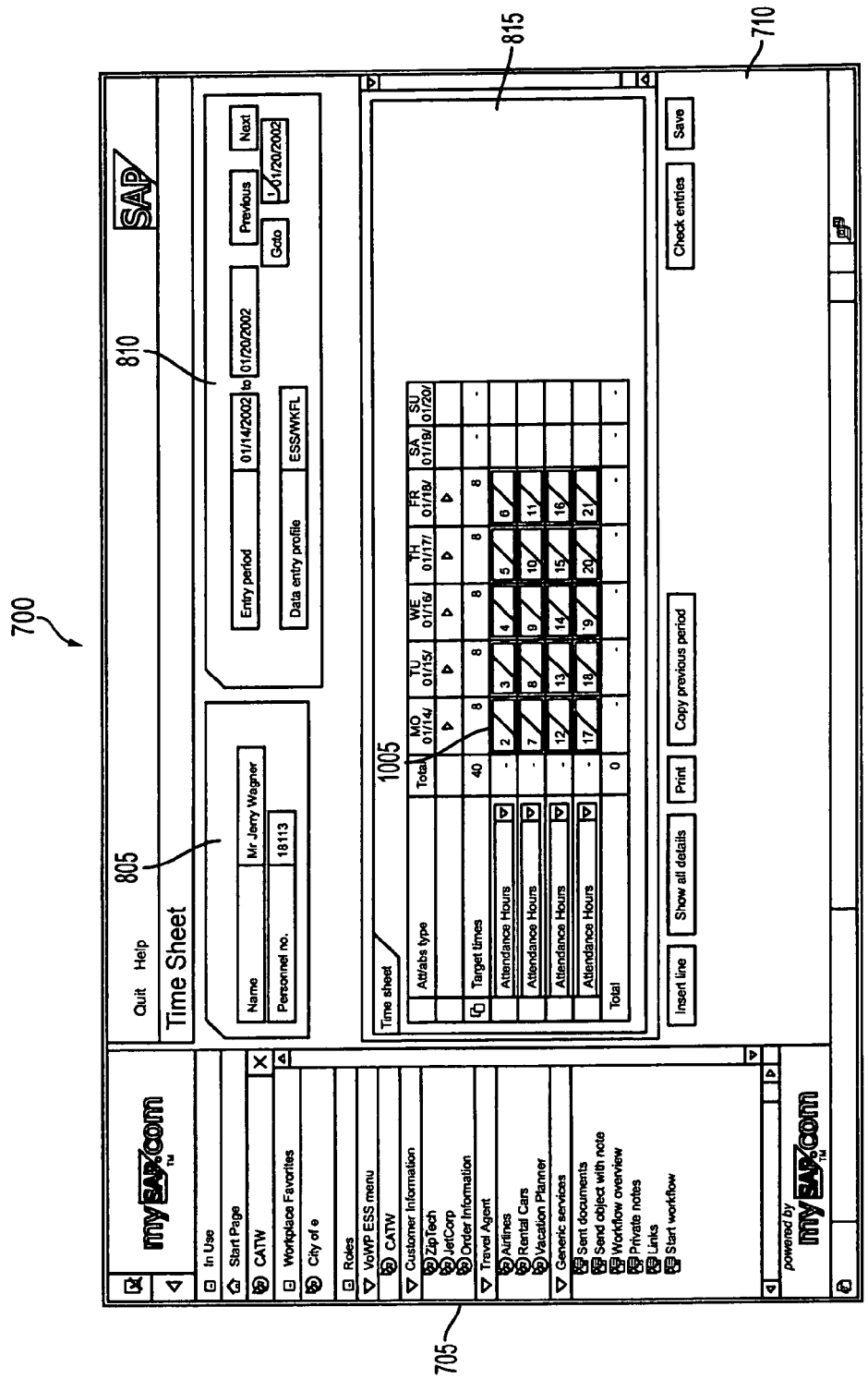

Referring to FIG. 10, visual cues and labels may be used within the time entry component 815 to enable disambiguation and clarification of voice commands. For example, the user may say "enter 8 hours of holiday time," which does not identify a day on which the holiday time is to be entered. The user may be prompted to identify a text field in which the amount of the holiday time may be entered. Each of the possible text fields into which the amount may be entered is indicated by a representational enumerated label, such as a representational enumerated label 1005 that identifies the upper leftmost text field of the time entry component 815. Each of the representational enumerated labels includes an identifier, such as a number, by which the corresponding text field may be identified. Label "1" is placed in the text field in the time period component 805. The remaining labels "2-21" are placed in the text fields of the time entry component 815. The user may identify the text field into which the amount of time is to be entered by the identifier of the corresponding label. The representational enumerated labels may be semi-transparent overlays placed over the corresponding user interface elements. Using semi-transparent overlays enables the identification of one of the text fields without substantially affecting the appearance of the text fields such that the user may view the text fields through the semi-transparent overlays.

Selecting one of the text fields automatically identifies a corresponding selection list in which a type of the entered time may be entered. More particularly, a selection list directly to the left of the identified text field will be used to specify that the entered time is holiday time. As a result, selecting one of the text fields clarifies the voice command initially received from the user. The semantic operation corresponding to the clarified voice command may be executed. More particularly, the representational enumerated labels may be cleared from the display area 710, and the selection list 905 and the text field 910 may be modified to indicate that 8 hours of holiday time has been entered for the first day, as illustrated in FIG. 9. Visual and audio feedback may be provided to indicate that the semantic operation has been executed, as illustrated in FIG. 9.

FIGS. 7-10 illustrate a voice interface for an electronic timekeeping system with which single voice commands may be issued to signal for the execution of semantic operations that include multiple sub-operations. The described techniques may be used to provide voice control in any graphical user interface.

Figure 11:
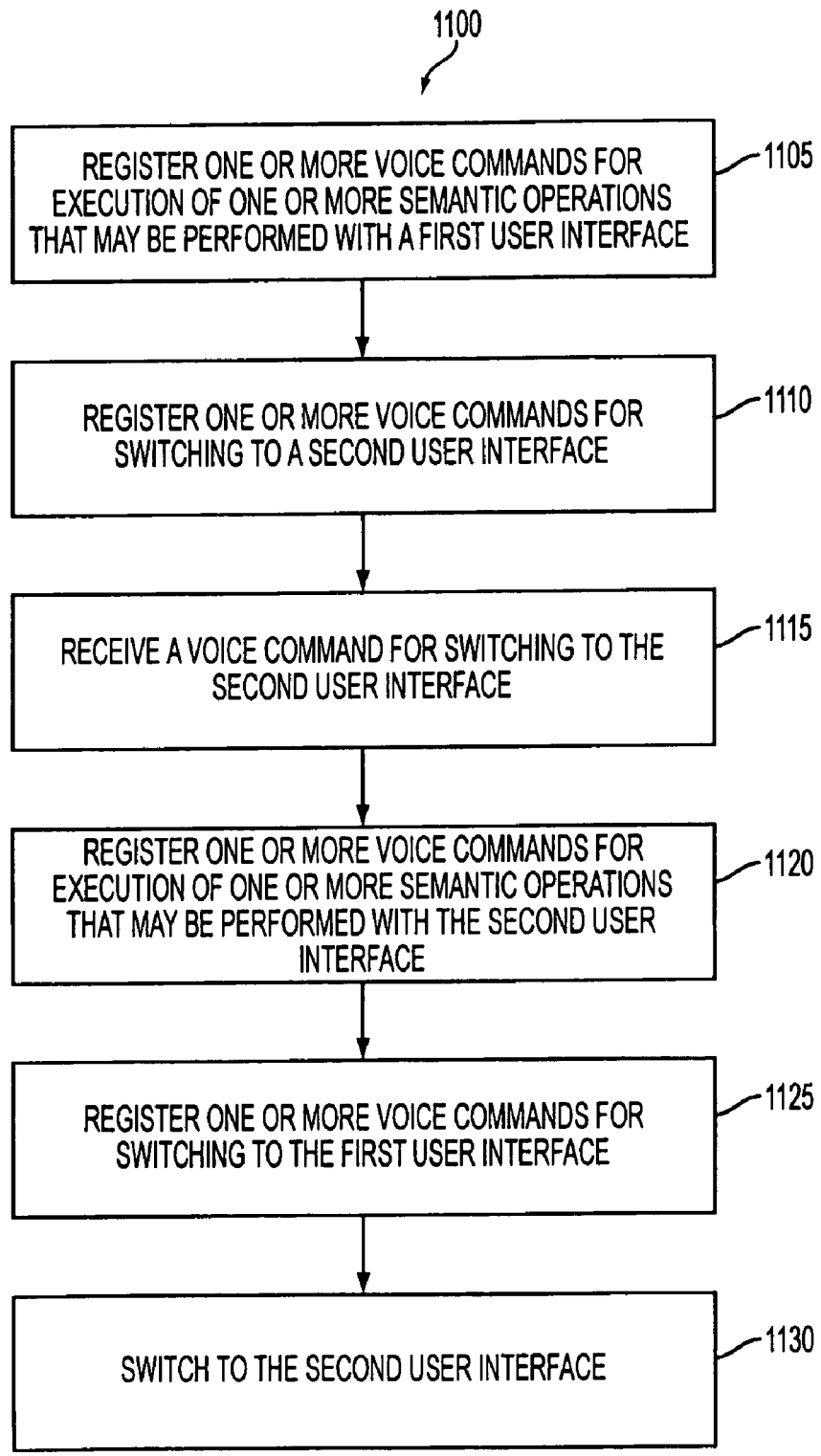
FIG. 11 is a flow chart of a process for switching between voice-enabled computer applications.

Referring to FIG. 11, a process 1100 is used to enable a user to signal for a switch between user interfaces for multiple applications such that semantic operations provided by each of the multiple applications may be executed in response to voice commands from the user. For example, the web portal illustrated in FIGS. 7-10 enables a user to switch between user interfaces provided by multiple applications. The process 1100 is executed by a voice extension module, such as the voice extension module 125 of FIGS. 1A, 1B, and 2. In some implementations, the voice extension module that executes the process 1100 may be shared among the user interfaces of the multiple applications.

The process 1100 begins when the voice extension module registers one or more voice commands for execution of one or more semantic operations that may be performed with a first user interface (1105). The voice commands may be registered by executing the process 500 of FIG. 5 for the first user interface. The voice commands enable the user to signal for the execution of semantic operations provided by the first user interface.

In addition, the voice extension module registers one or more voice commands for switching to a second user interface (1110). Such voice commands may be registered in a manner similar to the voice commands for the semantic operations of the first user interface. More particularly, switching from the first user interface to the second user interface may be identified as a semantic operation that may be performed with the first user interface. As a result, voice commands for such a switch may be registered according to the process 500. Registering those voice commands enables the user to switch to the second user interface in case the user needs to execute one or more semantic operations provided by the second user interface.

In some implementations, voice commands for execution of one or more semantic operations that may be performed with the second user interface are registered in addition to the voice commands for switching to the second user interface. In addition, voice commands that signal for both a switch to the second user interface and for execution of a semantic operation provided by the second user interface may be registered. Such voice commands may be registered by executing the process 500.

The voice extension module receives a voice command for switching to the second user interface (1115). The voice command may be identified according to the process 600 of FIG. 6. The voice command may signal only for a switch to the second user interface, or for a switch to the second user interface and for execution of a semantic operation provided by the second user interface.

Prior to executing the switch from the first user interface to the second user interface, the voice extension module may prevent previously registered voice commands from being recognized further, because those voice commands may not be needed once the switch to the second user interface is made. The voice extension module also registers one or more voice commands for execution of one or more semantic operations that may be performed with the second user interface, if such commands have not been registered already (1120). The voice commands may be registered by executing the process 500 for the second user interface. The voice commands enable the user to signal for the execution of semantic operations provided by the second user interface once a switch to the second user interface is made.

The voice extension module also registers one or more voice commands for switching to the first user interface (1125). Such voice commands may be registered in a manner similar to the voice commands for the semantic operations of the second user interface. More particularly, switching from the second user interface to the first user interface may be identified as a semantic operation that may be performed with the second user interface. As a result, voice commands for such a switch may be registered according to the process 500.

In some implementations, voice commands for execution of one or more semantic operations that may be performed with a first user interface may be registered in addition to the voice commands for switching to the first user interface, if such voice commands are not already registered. In addition, voice commands that signal for both a switch to the first user interface and for execution of a semantic operation provided by the first user interface may be registered. Such voice commands may be registered by executing the process 500 of FIG. 5.

After the commands are registered, a switch is made to the second user interface (1130). The switch is made in response to the voice command received from the user (1115). Before switching to the second user interface, the user may be prompted to save a current state of the first interface such that the current state may be restored the next time the first user interface is accessed. Depending on the voice command that was received from the user, a semantic operation provided by the second user interface may be executed in addition to the switch to the second user interface. Once the switch has been completed, the user may issue further voice commands to signal for execution of the semantic operations provided by the second user interface, or to signal for a switch back to the first user interface.

In one implementation, the first user interface is a user interface to an electronic timekeeping application, and the second user interface is a user interface to an application for generating leave requests. Voice commands for signaling for execution of a semantic operation provided by the electronic timekeeping application and voice commands for signaling for a switch to the leave request application are registered (1105, 1110). While creating a time entry for vacation time with the electronic timekeeping application, a user may realize that a leave request for the vacation time must be submitted. As a result, the user may issue a voice command for switching to the user interface for the leave request application such that the leave request may be generated (1115). In response, voice commands for signaling for execution of a semantic operation provided by the leave request application and voice commands for signaling for a switch to the electronic timekeeping application are registered (1120, 1125). A switch is made to the user interface for the leave request application (1130), and the user may issue voice commands for generating the leave request. After the leave request has been generated, the user may issue a voice command to signal for a switch back to the electronic timekeeping application. Alternatively or additionally, the user may continue to use the leave request application.

The implementation of the process 1100 illustrated in FIG. 11 enables a user to signal for a switch between two user interfaces for two applications such that semantic operations provided by each of the two applications may be executed in response to voice commands from the user. Other implementations of the process 1100 may enable a user to signal for a switch between any number of user interfaces for any number of applications such that semantic operations provided by each of the applications may be executed in response to voice commands from the user.

The process 1100 is used to register voice commands for switching between, and for signaling for execution of semantic operations provided by, multiple user interfaces. In the illustrated implementation of the process 1100, the commands for switching from, or for signaling for execution of a semantic operation provided by, a user interface are registered when a switch to the user interface is to be made. In other implementations, commands for switching between, and for signaling for execution of semantic operations provided by, all of the multiple user interfaces may be registered before any of the multiple user interfaces are used. Therefore, when a voice command for switching to a different user interface is received, the switch may be made without first registering additional voice commands corresponding to the different user interface. However, in such implementations, a switch to a user interface is performed before any semantic operations provided by the user interface may be executed in response to a corresponding voice command.

The techniques for voice-enabling user interfaces are described above in the context of a standalone graphical user interface and a web-based user interface presented in a web browser. More particularly, the techniques are described in the context of a client-server architecture in which a user interface is separated from an application corresponding to the user interface. Such an architecture enables or requires the user interface to be voice-enabled without modifying the application, because the user interface is not a component of the application. However, the described techniques may be applied in other architectures in which an application and a corresponding user interface are not separated. In such architectures, voice-enabling the user interface may require modification of the application.

Semantic operations provided by a user interface are described throughout as being performed in response to voice commands from a user of the user interface. However, other operations provided by the user interface may be performed in response to voice commands from the user. For example, individual graphical elements of the user interface, such as a text field, a selection list, a scroll bar, a slider, a radio button, a checkbox, an icon, or a button may be controlled in response to voice commands from the user. The user interface elements may be selected or activated in response to a voice command. In addition, the user interface elements may be modified in response to a voice command. For example, in response to a voice command, data may be entered into a text field, an option provided by a selection list may be selected, or a position of a scroll bar or a slider may be changed.

Voice commands for controlling the user interface elements are registered with a speech recognition engine and an input handler of a voice recognition module corresponding to the user interface to enable the voice commands to be recognized. The voice commands may be identified by parsing information specifying the user interface to identify the user interface elements, and then by identifying voice commands for controlling the identified user interface elements.

The voice commands described throughout as being used to signal for execution of a semantic operation provided by a user interface, or to control a graphical element of the user interface, may be representative of multiple languages. For example, a voice extension module that voice-enables the user interface may register one ore more voice commands for signaling for execution of a semantic operation provided by the user interface that are representative of multiple languages such that one of the multiple languages may be used to signal for execution of the semantic operation. More particularly, voice commands that are representative of multiple languages may be used to signal for execution of semantic operations provided by a user interface.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A voice-enabled user interface comprising:
a first user interface; and
a voice extension module associated with the first user interface and configured to voice-enable the first user interface, the voice extension module including:
   a speech recognition engine;
   an XML configuration repository that includes one or more XML files specifying one or more voice commands for signaling for execution of one or more semantic operations that may be performed using the first user interface;
   a preprocessor that is configured to register with the speech recognition engine the one or more voice commands; and
   an input handler that is configured to receive a first voice command and to communicate with the preprocessor to execute a semantic operation from the one or more semantic operations that may be performed using the first user interface, wherein the first voice command is one of the one or more voice commands registered with the speech recognition engine by the preprocessor, and wherein the first voice command signals for execution of the semantic operation,
wherein:
   the one or more XML files included in the XML configuration repository specify one or more additional voice commands for switching to a second user interface;
   the preprocessor is configured to register with the speech recognition engine the one or more additional voice commands; and
   the input handler is configured to receive a second voice command and to communicate with the preprocessor to switch to the second user interface, wherein the second voice command is one of the one or more additional voice commands registered with the speech recognition engine by the preprocessor.

2. The voice-enabled user interface of claim 1 wherein:
the XML configuration repository categorizes the one or more voice commands into one or more roles of users of the first user interface; and the preprocessor is configured to register with the speech recognition engine one or more voice commands from within the XML configuration repository that are representative of a particular one of the one or more roles, the particular role corresponding to a user of the first user interface.

3. The voice-enabled user interface of claim 1 wherein the voice extension module includes an error handler that is configured (i) to handle errors in the execution of the semantic operation that is executed in response to the first voice command, and (ii) to prompt for additional information that further specifies the semantic operation that is executed in response to the first voice command.

4. The voice-enabled user interface of claim 1 wherein the preprocessor comprises:
   a parser that is configured to identify the one or more voice commands from the one or more XML files included in the XML configuration repository; and
   a translator that is configured to register the one or more voice commands with the speech recognition engine such that the one or more semantic operations may be executed in response to the one or more voice commands.

5. The voice-enabled user interface of claim 1 wherein the voice extension module includes a web service interface that is configured (i) to receive the one or more XML files included in the XML configuration repository, and (ii) to store the received XML files in the XML configuration repository.

6. A voice extension module for voice-enabling a user interface comprising:
   a speech recognition engine;
   an XML configuration repository that includes one or more XML files specifying one or more voice commands for signaling for execution of one or more semantic operations that may be performed using a first user interface;
   a preprocessor that is configured to register with the speech recognition engine the one or more voice commands; and
   an input handler that is configured to receive a first voice command and to communicate with the preprocessor to execute a semantic operation from the one or more semantic operations that may be performed using the first user interface, wherein the first voice command is one of the one or more voice commands registered with the speech recognition engine by the preprocessor, and wherein the first voice command signals for execution of the semantic operation,
   wherein:
      the one or more XML files included in the XML configuration repository specify one or more additional voice commands for switching to a second user interface;
      the preprocessor is configured to register with the speech recognition engine the one or more additional voice commands; and
      the input handler is configured to receive a second voice command and to communicate with the preprocessor to switch to the second user interface, wherein the second voice command is one of the one or more additional voice commands registered with the speech recognition engine by the preprocessor.

7. The voice extension module of claim 6 wherein:
   the XML configuration repository categorizes the one or more voice commands into one or more roles of users of the first user interface; and
   the preprocessor is configured to register with the speech recognition engine one or more voice commands from within the XML configuration repository that are representative of a particular one of the one or more roles, the particular role corresponding to a user of the first user interface.

8. The voice extension module of claim 6 further comprising an error handler that is configured (i) to handle errors in the execution of the semantic operation that is executed in response to the first voice command, and (ii) to prompt for additional information that further specifies the semantic operation that is executed in response to the first voice command.

9. The voice extension module of claim 6 wherein the preprocessor comprises;
   a parser that is configured to identify the one or more voice commands from the one or more XML files included in the XML configuration repository; and
   a translator that is configured to register the one or more voice commands with the speech recognition engine such that the one or more semantic operations may be executed in response to the one or more voice commands.

10. The voice extension module of claim 6 further comprising a web service interface that is configured (i) to receive the one or more XML files included in the XML configuration repository, and (ii) to store the received XML files in the XML configuration repository.

11. A method for enabling a user interface to be controlled with voice commands, the method comprising:
   accessing an XML configuration repository that specifies one or more voice commands for execution of one or more semantic operations that may be performed using a first user interface for a first application, each voice command corresponding to at least one of the semantic operations;
   identifying at least one of the voice commands from the XML configuration repository;
   registering the identified voice command with a speech recognition engine and an input handler to enable voice control of the first user interface;
   performing a particular one of the one or more semantic operations in response to a first voice command, wherein the first voice command is the voice command registered with the speech recognition engine and the input handler, and wherein the first voice command corresponds to the particular semantic operation;
   identifying at least one additional voice command from the XML configuration repository, the at least one additional voice command corresponding to one or more switches to a second user interface for a second application;
   registering the at least one additional voice command with the speech recognition engine and the input handler to enable switching to the second user interface; and
   performing a particular one of the switches to the second user interface in response to a second voice command, wherein the second voice command is the additional voice command registered with the speech recognition engine and the input handler, and wherein the second voice command corresponds to the particular switch to the second user interface.

12. The method of claim 11 further comprising identifying a role of a user of the first user interface, wherein the one or more voice commands are organized within the XML configuration repository into one or more roles of users of the first user interface, and wherein identifying at least one of the voice commands comprises identifying one or more voice commands that correspond to the identified role from the XML configuration repository.

13. The method of claim 11 wherein identifying the one or more voice commands from the XML configuration repository comprises parsing one or more XML files included in the XML configuration repository to identify the one or more voice commands.

14. The method of claim 11 further comprising handling errors in the execution of the particular semantic operation that is performed in response to the first voice command with an error handler.

15. A voice-enabled user interface comprising:
first and second user interfaces; and
a voice extension module associated with the first user interface and configured to voice-enable the first user interface, the voice extension module including:
 a speech recognition engine;
 an XML configuration repository that includes one or more XML files specifying one or more voice commands for signaling for execution of one or more semantic operations that may be performed using the first user interface;
 a preprocessor that is configured to register with the speech recognition engine the one or more voice commands; and
 an input handler that is configured to receive a first voice command and to communicate with the preprocessor to execute a semantic operation from the one or more semantic operations that may be performed using the first user interface, wherein the first voice command is one of the one or more voice commands registered with the speech recognition engine by the preprocessor, and wherein the first voice command signals for execution of the semantic operation,
wherein:
 the one or more XML files included in the XML configuration repository specify one or more additional voice commands for signaling for execution of one or more semantic operations that may be performed using the second user interface;
 the preprocessor is configured to register with the speech recognition engine the one or more additional voice commands; and
 the input handler is configured to receive a second voice command and to communicate with the preprocessor to execute a semantic operation from the one or more semantic operations that may be performed using the second user interface, wherein the second voice command is one of the one or more additional voice commands registered with the speech recognition engine by the preprocessor, and wherein the second voice command signals for execution of the semantic operation.

16. A voice extension module for voice-enabling a user interface comprising:
a speech recognition engine;
an XML configuration repository that includes one or more XML files specifying one or more voice commands for signaling for execution of one or more semantic operations that may be performed using a first user interface;
a preprocessor that is configured to register with the speech recognition engine the one or more voice commands; and
an input handler that is configured to receive a first voice command and to communicate with the preprocessor to execute a semantic operation from the one or more semantic operations that may be performed using the first user interface, wherein the first voice command is one of the one or more voice commands registered with the speech recognition engine by the preprocessor, and wherein the first voice command signals for execution of the semantic operation,
wherein:
 the one or more XML files included in the XML configuration repository specify one or more additional voice commands for signaling for execution of one or more semantic operations that may be performed using a second user interface;
 the preprocessor is configured to register with the speech recognition engine the one or more additional voice commands; and
 the input handler is configured to receive a second voice command and to communicate with the preprocessor to execute a semantic operation from the one or more semantic operations that may be performed using the second user interface, wherein the second voice command is one of the one or more additional voice commands registered with the speech recognition engine by the preprocessor, and wherein the second voice command signals for execution of the semantic operation.

17. A method for enabling a user interface to be controlled with voice commands, the method comprising:
accessing an XML configuration repository that specifies one or more voice commands for execution of one or more semantic operations that may be performed using a first user interface for a first application, each voice command corresponding to at least one of the semantic operations;
identifying at least one of the voice commands from the XML configuration repository;
registering the identified voice command with a speech recognition engine and an input handler to enable voice control of the first user interface;
performing a particular one of the one or more semantic operations in response to a first voice command, wherein the first voice command is the voice command registered with the speech recognition engine and the input handler, and wherein the first voice command corresponds to the particular semantic operation,
identifying at least one additional voice command from the XML configuration repository, the at least one additional voice command corresponding to one or more semantic operations that may be performed using a second user interface for a second application;
registering the at least one additional voice command with the speech recognition engine and the input handler to enable voice control of the second user interface; and
performing a particular one of the semantic operations that may be performed using the second user interface in response to a second voice command, wherein the second voice command is the additional voice command registered with the speech recognition engine and the input handler, and wherein the second voice command corresponds to the particular semantic operation.

* * * * *